(12) United States Patent
Park et al.

(10) Patent No.: US 11,893,761 B2
(45) Date of Patent: Feb. 6, 2024

(54) IMAGE PROCESSING APPARATUS AND METHOD

(71) Applicant: SAMSUNG ELECTRONICS CO., LTD., Suwon-si (KR)

(72) Inventors: Jinsol Park, Suwon-si (KR); Jeongrok Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 374 days.

(21) Appl. No.: 17/150,642

(22) Filed: Jan. 15, 2021

(65) Prior Publication Data
US 2021/0225040 A1    Jul. 22, 2021

(30) Foreign Application Priority Data
Jan. 16, 2020    (KR) .................. 10-2020-0006160

(51) Int. Cl.
| G06T 9/00 | (2006.01) |
| G06F 1/03 | (2006.01) |
| G06T 3/40 | (2006.01) |
| G06V 20/64 | (2022.01) |

(52) U.S. Cl.
CPC ............. *G06T 9/002* (2013.01); *G06F 1/03* (2013.01); *G06T 3/4046* (2013.01); *G06V 20/64* (2022.01)

(58) Field of Classification Search
None
See application file for complete search history.

(56) References Cited

U.S. PATENT DOCUMENTS

| 5,394,484 | A | * | 2/1995 | Casey ................. G06V 30/242 382/226 |
| 7,184,994 | B2 | * | 2/2007 | Bella .................... G06F 18/21 382/123 |
| 9,953,216 | B2 | * | 4/2018 | Alvarez ............. G06F 3/04845 |
| 10,009,545 | B2 | * | 6/2018 | Park .................... H04N 23/635 |
| 10,115,015 | B2 | * | 10/2018 | Son ....................... G06V 10/17 |
| 10,838,507 | B2 | * | 11/2020 | Harris ................... G06F 3/011 |
| 2002/0103776 | A1 | * | 8/2002 | Bella .................... G06F 18/21 706/45 |

(Continued)

FOREIGN PATENT DOCUMENTS

| KR | 10-1980551 B1 | 5/2019 |
| KR | 10-2019-0119205 A | 10/2019 |

(Continued)

OTHER PUBLICATIONS

Takayuki Ujiie et al., "Interpolation-based Object Detection Using Motion Vectors for Embedded Real-time Tracking Systems", Proceedings of the IEEE Conference on Computer Vision and Pattern Recognition (CVPR) Workshops, 2018, pp. 729-737, 9 pages total.

(Continued)

*Primary Examiner* — Anand P Bhatnagar
(74) *Attorney, Agent, or Firm* — Sughrue Mion, PLLC

(57) ABSTRACT

An image processing apparatus including a decoder configured to identify an area in an image frame at which object recognition is to be performed by using type information of a macroblock included in the image frame, and perform object recognition on the area of the image frame and skip the object recognition on areas of the image frame other than the area.

21 Claims, 16 Drawing Sheets

(56) References Cited

U.S. PATENT DOCUMENTS

| | | | |
|---|---|---|---|
| 2016/0109954 A1* | 4/2016 | Harris | G06V 20/20 |
| | | | 345/156 |
| 2018/0157336 A1* | 6/2018 | Harris | G06V 40/28 |
| 2019/0057256 A1* | 2/2019 | Son | G06V 20/00 |
| 2020/0342651 A1* | 10/2020 | Sudheendra | G06F 1/1686 |

FOREIGN PATENT DOCUMENTS

| | | | | |
|---|---|---|---|---|
| WO | 2010/057170 A1 | | 5/2010 | |
| WO | WO-2010057170 A1 | * | 5/2010 | ........... H04N 19/107 |
| WO | 2019/156287 A1 | | 8/2019 | |
| WO | WO-2019156287 A1 | * | 8/2019 | ........... H04N 19/102 |

OTHER PUBLICATIONS

Chao-Yuan Wu et al., "Compressed Video Action Recognition", Proceedings of the IEEE Conference on Computer Vision and Pattern Recognition (CVPR), 2018, pp. 6026-6035, 10 pages total.
Communication dated Jun. 1, 2021, from the European Patent Office in European Application No. 21151393.2.

* cited by examiner

IMAGE PROCESSING APPARATUS AND METHOD

CROSS-REFERENCE TO RELATED APPLICATION

This application is based on and claims priority under 35 U.S.C. § 119 to Korean Patent Application No. 10-2020-0006160, filed on Jan. 16, 2020, in the Korean Intellectual Property Office, the disclosure of which is incorporated by reference herein in its entirety.

BACKGROUND

1. Field

The disclosure relates to an image processing apparatus and an operating method thereof, and more particularly, to an image processing apparatus and method for identifying an area in which object recognition is to be performed by using encoding information of a compressed image and performing object recognition in the identified area.

2. Description of Related Art

A video signal includes pictures, and during encoding each of the pictures is split into certain areas, such as blocks. The blocks may be classified into intra blocks and inter blocks. Encoded image data is generated as a bitstream according to a certain format defined in a video codec and is transmitted to a decoding apparatus. The decoding apparatus decodes an image sequence and outputs image data.

An artificial Intelligence (AI) system is a system that self-learns and makes decisions, and derives a desired result or performs a target operation based on processing input data.

SUMMARY

Provided is an image processing apparatus and method for identifying an area in which object recognition is to be performed by using encoding information of a compressed image.

Provided is an image processing apparatus and method for performing object recognition in an identified area.

Additional aspects will be set forth in part in the description which follows and, in part, will be apparent from the description, or may be learned by practice of the presented embodiments of the disclosure.

According to an embodiment of the disclosure, an image processing apparatus includes a memory storing one or more instructions, and a processor configured to execute the one or more instructions stored in the memory to obtain type information of a macroblock of an image frame from an encoded image sequence and to identify an area in the image frame at which object recognition is to be performed based on the type information.

The processor may be further configured to execute the one or more instructions to identify, based on the type information, the area in the image frame by generating a lookup table storing a lookup table value of 0 or 1 for each pixel of the image frame.

The processor may be further configured to execute the one or more instructions to perform the object recognition in the area of the frame by using a neural network and skip the object recognition in areas of the image frame other than the area.

The processor may be further configured to execute the one or more instructions to, when a quantity of pixels of the image frame whose lookup table values are 1 is equal to or greater than a threshold number, perform the object recognition in the area of the frame by using the neural network.

The image processing apparatus may further include a communicator configured to communicate with a neural network, wherein the communicator is further configured to transmit the image frame and the lookup table to the neural network to perform the object recognition in the area of the frame and skips performing the object recognition in areas of the image frame other than the area.

The processor may be further configured to execute the one or more instructions to, when the macroblock identified from the type information is a skip macroblock, set a lookup table value of a pixel of the skip macroblock in the lookup table to 0.

The processor may be further configured to execute the one or more instructions to identify a quantity of consecutive skip macroblocks and set lookup table values of pixels for the quantity of consecutive skip macroblocks to 0.

The processor may be further configured to execute the one or more instructions to, when the macroblock identified from the type information is an intra macroblock, set a lookup table value of a pixel of the intra macroblock in the lookup table to 1.

The processor may be further configured to execute the one or more instructions to, when the macroblock identified from the type information is an inter macroblock, set a lookup table value of a pixel of the inter macroblock in the lookup table to 1 or 0 according to whether motion information of the inter macroblock satisfies a criterion.

The processor may be further configured to execute the one or more instructions to, when a size of a motion vector included in the motion information is equal to or less than a threshold value, set the lookup table value of the pixel of the inter macroblock in the lookup table to 0.

According to another embodiment of the disclosure, an image processing method includes obtaining type information of a macroblock of an image frame by decoding an encoded image sequence, identifying an area in the image frame at which object recognition is to be performed based on the type information, performing the object recognition in the area of the frame by using a neural network, and skipping the object recognition operation areas of the image frame other than the area.

The identifying of the certain area of the frame may include generating a lookup table storing a lookup table value of 1 or 0 for each pixel of the image frame based on the type information of the macroblock, and identifying the area of the image frame by using the lookup table.

The performing of the object recognition operation may include identifying, by using the neural network, pixels of the image frame whose lookup table values in the lookup table are 1 as the area.

The performing of the object recognition operation in the identified certain area may include, when a quantity of pixels of the image frame whose lookup table values are 1 is equal to or greater than a threshold number, performing the object recognition in the area.

The generating of the lookup table may include, when the macroblock identified from the type information is a skip macroblock, setting a lookup table value of a pixel of the skip macroblock in the lookup table to 0.

The image processing method may further include identifying the number of consecutive skip macroblocks, wherein the setting of the lookup table value of the pixel of the skip macroblock to 0 comprises setting lookup table values of pixels for the quantity of consecutive skip macroblocks to 0.

The generating of the lookup table may include, when the macroblock identified from the type information is an intra macroblock, setting a lookup table value of a pixel of the intra macroblock in the lookup table to 1.

The generating of the lookup table may include, when the macroblock identified from the type information is an inter macroblock, setting a lookup table value of a pixel of the inter macroblock in the lookup table to 1 or 0 according to whether motion information of the inter macroblock satisfies a criterion.

The generating of the lookup table may include, when a size of a motion vector included in the motion information is equal to or less than a threshold value, setting the lookup table value of the pixel of the inter macroblock in the lookup table to 0.

According to another embodiment of the disclosure, a non-transitory computer-readable recording medium has embodied thereon a program for executing an image processing method including obtaining type information of a macroblock of an image frame by decoding an encoded image sequence, identifying an area in the image frame at which object recognition is to be performed based on the type information, performing the object recognition in the area of the frame by using a neural network, and skipping the object recognition operation areas of the image frame other than the area.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
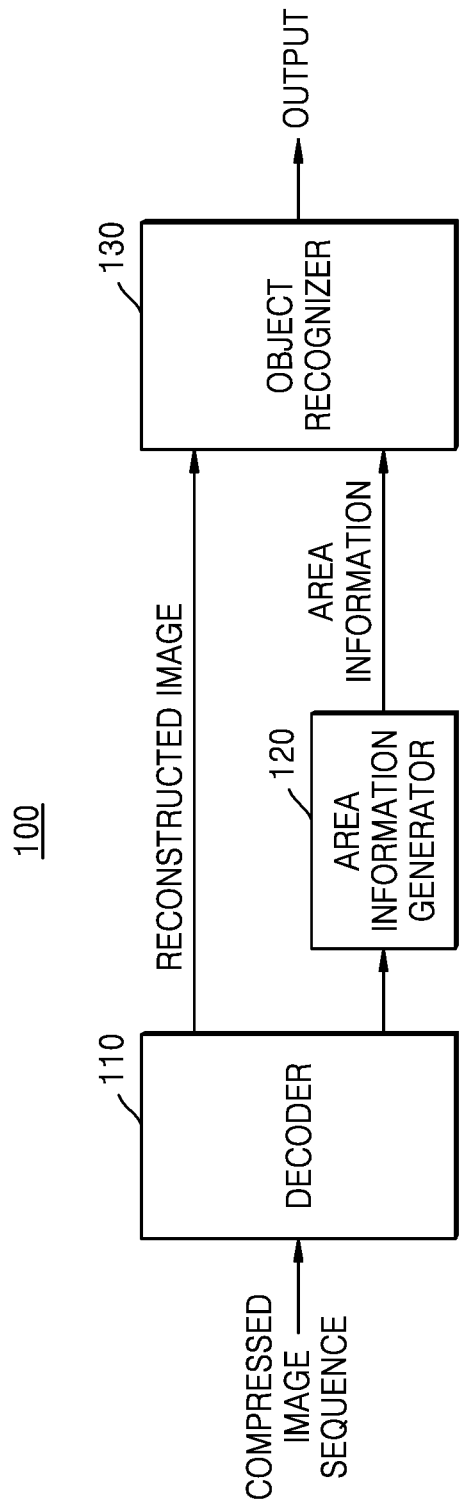
FIG. 1 is a block diagram of an image processing apparatus according to an embodiment of the disclosure.

Hereinafter, embodiments of the disclosure will be described in detail to enable one of ordinary skill in the art to easily practice the disclosure with reference to the attached drawings. The disclosure may, however, be implemented in many different forms and should not be construed as being limited to the embodiments of the disclosure set forth herein.

In the disclosure, general terms that are widely understood are selected, in consideration of functions in the disclosure, but various other terms may be selected according to the intentions of technicians in the art, precedents, new technologies, etc. Therefore, the terms used herein are not merely designations of the terms, but the terms are defined based on the meaning of the terms and content throughout the disclosure.

Also, the terms used herein are for the purpose of describing certain embodiments of the disclosure only and are not intended to be limiting of the disclosure.

Throughout the specification, when a component is referred to as being "connected" to another component, it will be understood to include that the component may be "directly connected" to the other component or "electrically connected" to the other component with another component therebetween.

In the specification and the claims, "the" and similar referents may be used to indicate both singular and plural forms. Also, an order of operations of a method according to the disclosure may be performed in an appropriate order. The order of operations is not limited to the order of the operations described.

The expressions "in some embodiments," "in an embodiment" and the like appearing in various parts of the specification may not necessarily refer to the same embodiment.

Some embodiments of the disclosure may be represented by functional block configurations and various operations. Some or all of the functional blocks may be implemented with various configurations of hardware and/or software components that perform certain functions. For example, the functional blocks of the disclosure may be implemented by one or more microprocessors or circuit configurations for a certain function. Also, for example, the functional blocks of the disclosure may be implemented in various programming or scripting languages. The functional blocks may be implemented in algorithms executed by one or more processors. Also, the disclosure may employ typical techniques for electronic configuration, signal processing, and/or data processing. The terms "mechanism," "element," "means" and "configuration" may be used broadly and are not limited to mechanical and physical components.

Also, lines or members connecting elements illustrated in the drawings are illustrative of functional connections and/or physical or circuit connections. In an actual device, the connections between components may be represented by various functional connections, physical connections, or circuit connections that are replaceable or added.

The terms such as "unit" or "module" refer to units that perform at least one function or operation, and the units may be implemented as hardware or software or as a combination of hardware and software.

Throughout the disclosure, the expression "at least one of a, b or c" indicates only a, only b, only c, both a and b, both a and c, both b and c, all of a, b, and c, or variations thereof.

The term "user" herein refers to a person who controls a function or an operation of an image processing apparatus by providing commands to the image processing apparatus, and may include a viewer, a manager, or an installation engineer.

The disclosure will now be described more fully with reference to the accompanying drawings, in which embodiments of the disclosure are shown.

FIG. 1 is a block diagram of an image processing apparatus 100 according to an embodiment of the disclosure. Referring to FIG. 1, the image processing apparatus 100 according to an embodiment of the disclosure may include a decoder 110, an area information generator 120, and an object recognizer 130.

In an embodiment of the disclosure, the image processing apparatus 100 may be an electronic device capable of receiving, decoding and reproducing a compressed image. The image processing apparatus 100 may be fixed or mobile. The image processing apparatus 100 may include at least one of, but is not limited to, a desktop, a digital TV, a smartphone, a tablet personal computer (PC), a mobile phone, a videophone, an e-book reader, a laptop PC, a netbook computer, a digital camera, a personal digital assistant (PDA), a portable multimedia player (PMP), a camcorder, a navigation system, a wearable device, a smart watch, a home network system, a security system, a medical device, or any other device which may decode a compressed image.

Multimedia data requires a wide bandwidth for transmission because the amount of multimedia data including video, audio, etc. is large. For example, an uncompressed image having a resolution of 4 K or more requires a high bandwidth of a level at which medium-to-long range transmission is impossible. A 4K 60 FPS uncompressed image having a resolution of 3840×2160 that is an ultra-high-definition (UHD) broadcast standard resolution requires a very high bandwidth of 11,384 Bbps per second. A compression coding method is therefore necessary to transmit such a large amount of data, and most image processing apparatuses include a decoder for decoding compressed data.

In FIG. 1, the decoder 110 may obtain a frame from a compressed image sequence. The decoder 110 may parse the compressed image sequence and may split the parsed image sequence into coding unit blocks. A coding unit may be a basic unit of a picture that is split for intra prediction and/or inter prediction. In an embodiment of the disclosure, the coding unit may be a macroblock, which may include a number of blocks. A size of the macroblock may be fixed or may be variable. The decoder 110 may decode image data that is encoded for each coding unit by using encoding information, and may generate a frame by collecting the decoded image data. Encoding information is information used to encode a moving picture, and the decoder 110 may decode the encoded data by using the encoding information for reproducing the moving picture. The image processing apparatus 100 may output a decoded frame through a display. Alternatively, in an embodiment of the disclosure, the image processing apparatus 100 may send the decoded frame to the object recognizer 130.

The object recognizer 130 may perform object recognition for objects in a frame. However, this is merely an example, and the object recognizer 130 may perform object recognition in a scene, a group of pictures (GOP), or the like. The following will be described, for convenience of explanation, assuming that object recognition is performed in a frame output by the decoder 110, but the disclosure is not limited thereto.

The object recognizer 130 may determine whether a recognizable object is included in a frame and/or whether the object moves, and may obtain information about the object.

In general, object recognition is performed by scanning an entire frame. In this configuration, there is a problem in that object recognition requires a long time and an excessive amount of computation because the entire frame is scanned.

In an embodiment of the disclosure, when the object recognizer 130 performs object recognition, the decoder 110 may perform object recognition by scanning only an area in which there is a difference between frames, instead of performing object recognition by scanning an entire decoded frame received from the decoder 110. To this end, the image processing apparatus 100 may generate area information by using the area information generator 120 and may allow the object recognizer 130 to refer to the area information so that the object recognizer 130 performs an object recognition operation only in a certain area corresponding to the area information.

In an embodiment of the disclosure, the image processing apparatus 100 may generate area information indicating an area in which there is a difference between frames, by using various encoding information obtained in a process of decoding a compressed image. In an embodiment of the disclosure, area information may include coordinate information of an area to be identified in a frame. In an embodiment of the disclosure, area information may be a lookup table in which an area to be identified and an area not to be identified in a frame are respectively represented as binary data of 1 and 0.

The object recognizer 130 may receive a frame from the decoder 110 and may receive area information from the area information generator 120, and may identify an area in which object recognition is to be performed in the frame. The object recognizer 130 may perform object recognition only in an area identified by the area information, not in the entire frame.

In an embodiment of the disclosure, the object recognizer 130 may perform object recognition in a certain area identified from area information, by using at least one neural network.

As such, according to an embodiment of the disclosure, the image processing apparatus 100 may generate area information indicating an area in which there is a difference between frames by using encoding information. The difference between the frames may be indicated by motion information. The image processing apparatus 100 does not perform object recognition by scanning all areas of a frame but performs object recognition only in a certain area, thereby reducing the amount of computation and time required to perform an object recognition operation.

Figure 2:
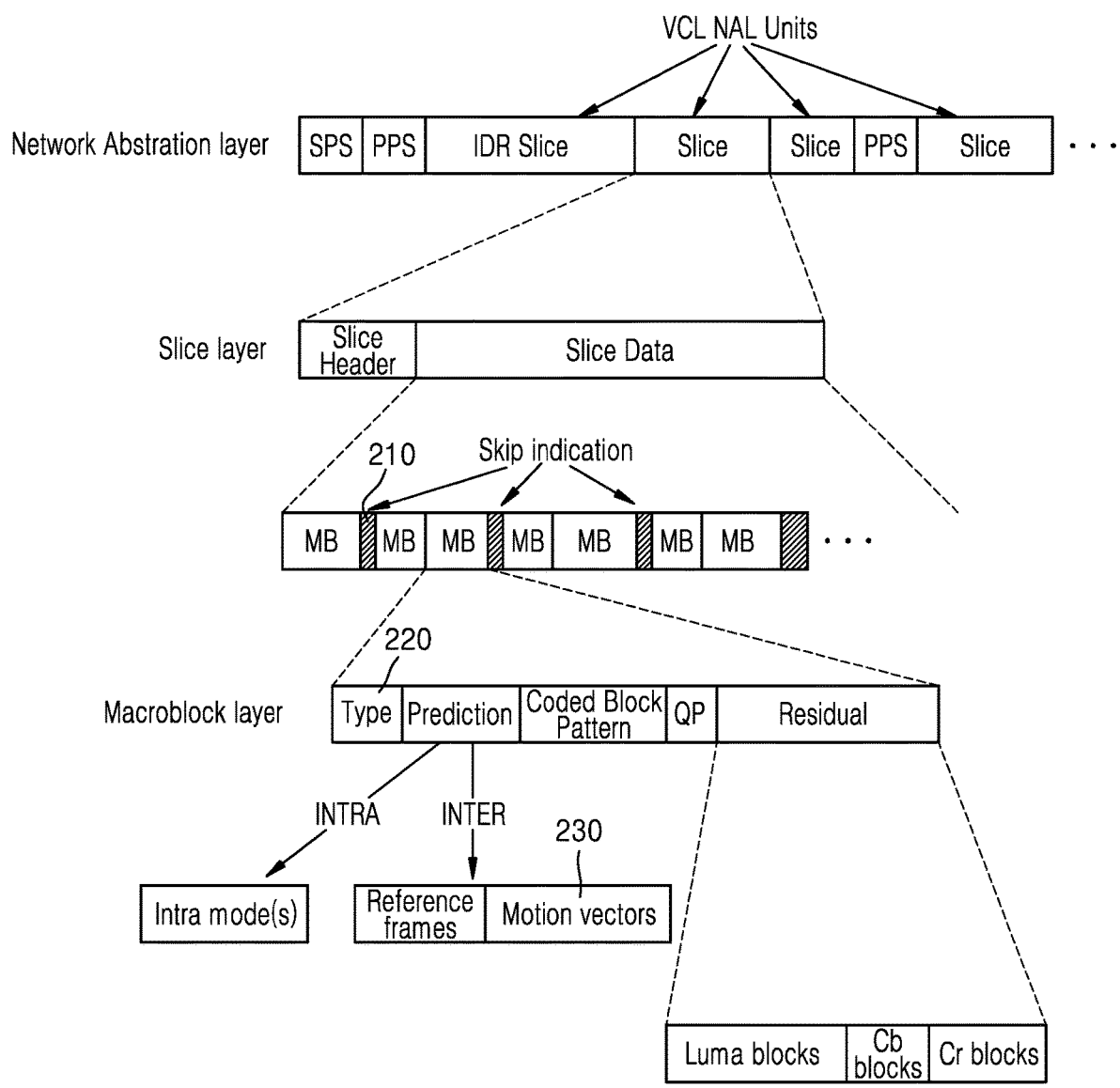
FIG. 2 is a diagram illustrating an image sequence compression format according to an embodiment of the disclosure.

FIG. 2 is a diagram illustrating an image sequence compression format according to an embodiment of the disclosure. FIG. 2 illustrates an image sequence according to an H.264/AVC compression format from among various compression formats. However, this is merely an example, and an image sequence received by the image processing apparatus 100 may be an image sequence according to a compression format different from that of FIG. 2, for example, according to an HEVC compression format or another compression format.

Referring to FIG. 2, the image sequence may be a compression bitstream including VCL NAL units. As shown in FIG. 2, an H.264/AVC compression format is composed of a video coding layer (VCL) that encodes a moving picture and a network abstraction layer (NAL) that is located between the VCL and a lower system layer to transmit and store encoded information.

Slices may be included in the NAL. Each slice that is a basic unit for encoding may include a slice header and slice data. The slice data may include skip indications 210 and macroblocks (MBs).

In general, according to moving picture compression standards, compression may be performed based on blocks. An encoding apparatus may split an input image into blocks having a size of N×N and may perform compression for each block. In this configuration, a block having a size of N×N may be a macroblock.

When there is a macroblock to be skipped, the encoding apparatus may generate information indicating the macroblock. Hereinafter, the skipped macroblock is referred to as a skip macroblock.

The skip macroblock may be an inter macroblock with no motion vector. The skip macroblock is a block according to a pre-determined promise between the encoding apparatus and the decoder 110, and when there is redundancy in macroblock information between frames, information of the macroblock to be coded is not transmitted and only a skip flag is transmitted.

The encoding apparatus may cause the skip indication 210 indicating the skip macroblock to be included in the slice. The skip indication 210 may be information indicating the number of consecutive skip macroblocks. That is, the skip indication 210 may include information about how many macroblocks are to be skipped from a macroblock of a current index. For example, when the skip indication 210 is skip=3, three macroblocks are to be skipped from the macroblock of the current index.

The decoder 110 sequentially reads macroblocks included in slice data, and identifies the macroblocks in the sequential order. When the decoder 110 reads a macroblock and then reads the skip indication 210, the decoder 110 may determine that the macroblock is a skip macroblock and may determine how many macroblocks are to be skipped from the macroblock. The decoder 110 skips as many skip macroblocks as the number indicated by the skip indication 210.

Macroblocks may be divided into intra macroblocks and inter macroblocks according to a compression method. As shown in FIG. 2, each macroblock may include type information 220 indicating whether the macroblock is an intra macroblock or an inter macroblock.

The intra macroblock is a macroblock that is independently coded in a current image, without referencing another image. That is, because the intra macroblock is compressed in an intra coding method, the intra macroblock is generated by using a current macroblock and neighboring pixels included in a current image.

The inter macroblock is a block coded by referencing a prediction block similar to the current macroblock in a reference image. The encoding apparatus may find a block most similar to the current block in the reference image such as a previous image and/or a subsequent image and may determine the block as a prediction block, and may generate motion information by expressing a positional difference between a current block and the prediction block as a motion vector. The motion information may include at least one of a reference frame indicating a reference image that is referenced, a prediction direction flag indicating whether prediction is performed in a past picture or a future picture, or a motion vector 230 indicating a position of the prediction block.

In an embodiment of the disclosure, the area information generator 120 may generate area information indicating an area in which an object recognition operation is to be performed in a frame, by using encoding information obtained by the decoder 110 from a bitstream.

In an embodiment of the disclosure, the encoding information may include information indicating whether a macroblock is a skip macroblock, an intra macroblock, or an inter macroblock. Hereinafter, information indicating a type of a macroblock, that is, information indicating whether a macroblock is a skip macroblock, an intra macroblock, or an inter macroblock, is referred to as type information. The type information may include at least one of the skip indication 210 or the type information 220 shown in FIG. 2.

When the area information generator 120 reads the skip indication 210 in the type information, the area information generator 120 may determine that a certain number of macroblocks from a current macroblock are skip macroblocks, and may generate area information indicating not to perform an object recognition operation in pixels corresponding to the skip macroblocks from among pixels included in the frame.

In an embodiment of the disclosure, when the area information generator 120 determines that a type of a macroblock is an intra macroblock from the type information, the area information generator 120 may generate area information indicating that an object recognition operation is to be performed in a pixel corresponding to the intra macroblock. This because the intra macroblock is image data that is independently coded without referencing another frame, and thus has an area different from a previous frame.

In an embodiment of the disclosure, when the area information generator 120 determines that a macroblock is an inter macroblock from the type information, the area information generator 120 may generate area information indicating that an object recognition operation is to be performed in a pixel corresponding to the inter macroblock. This is because the inter macroblock is a macroblock that references a macroblock similar to a current macroblock in a reference frame such as a previous frame or a subsequent frame, and thus is likely to be different from a macroblock located at the same position as the inter macroblock in the previous frame.

In another embodiment of the disclosure, when a macroblock is an inter macroblock, the area information generator 120 may obtain the motion vector 230 included in motion information of the inter macroblock, and may determine whether to perform an object recognition operation in a pixel corresponding to the inter macroblock based on a scalar value of the motion vector 230.

As such, according to an embodiment of the disclosure, the image processing apparatus 100 may identify an area in which an object recognition is to be performed and may generate area information indicating the identified area, by using encoding information included in an image sequence.

Figure 3:
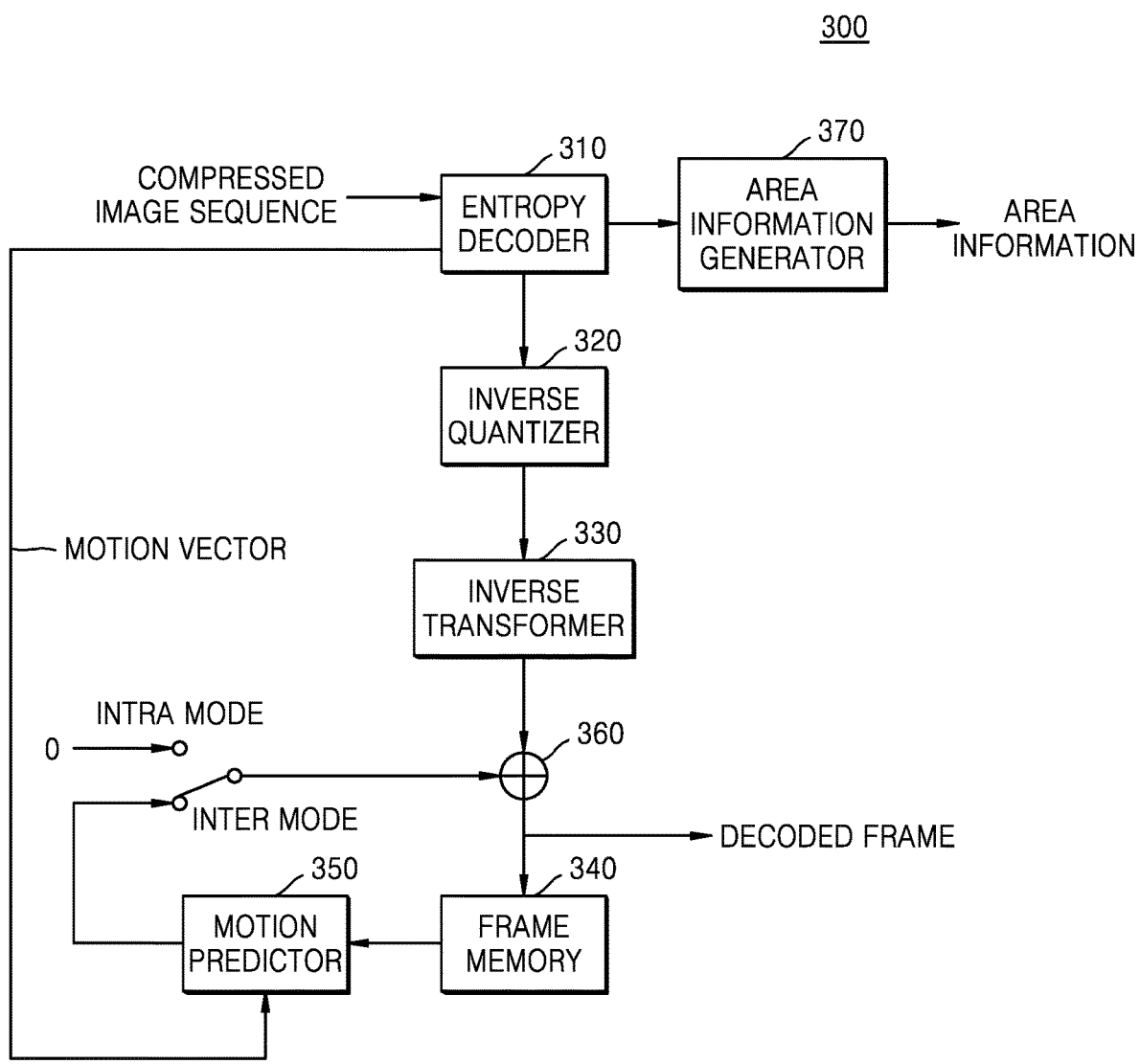
FIG. 3 is a block diagram of an image processing apparatus according to an embodiment of the disclosure.

FIG. 3 is a block diagram of an image processing apparatus 300 according to an embodiment of the disclosure. Referring to FIG. 3, the image processing apparatus 300 may include an entropy decoder 310, an inverse quantizer 320, an inverse transformer 330, a frame memory 340, a motion predictor 350, an adder 360, and an area information generator 370.

In FIG. 3, the entropy decoder 310, the inverse quantizer 320, the inverse transformer 330, the frame memory 340, the motion predictor 350, and the adder 360 may perform a function of a decoder for decoding an input bitstream.

The entropy decoder 310 extracts a quantized transform block by decoding the input bitstream. The entropy decoder 310 may reconstruct the quantized transform block having a quantized transform coefficient by decoding and inversely scanning a bit string extracted from the bitstream. The term 'transform block' may refer to a block obtained by transforming a residual block. The term 'residual block' may refer to a difference between a current block and a prediction block. The entropy decoder 310 sends the quantized transform block to the inverse quantizer 320.

Also, when a macroblock included in the bitstream is an inter macroblock, the entropy decoder 310 may obtain motion information of a current macroblock from the bitstream. The motion information may include at least one of a reference frame index, a prediction direction flag, or a motion vector. In detail, the entropy decoder 310 may extract an encoded differential vector from the bitstream, and may obtain a decoded differential vector by decoding the encoded differential vector. Also, the entropy decoder 310 may extract a reference frame index and/or a prediction direction flag from the bitstream, and may reconstruct a motion vector of a macroblock corresponding to a position identified by using the extracted index as a prediction motion vector. The entropy decoder 310 may reconstruct a motion vector of a current block to be reconstructed by adding the reconstructed prediction motion vector to the decoded differential vector. The entropy decoder 310 sends the reconstructed motion vector to the prediction predictor 350.

The inverse quantizer 320 inversely quantizes the quantized transform block received from the entropy decoder 310. The inverse transformer 330 reconstructs a residual block having a reconstructed residual signal by inversely transforming a transform coefficient of the inversely quantized transform block received from the inverse quantizer 320. The motion predictor 350 may obtain a prediction block in a frame stored in the frame memory 340, by using the motion information received from the entropy decoder 310. The adder 360 may obtain a current inter macroblock by using the prediction block obtained by the motion predictor 350 and the residual block received from the inverse transformer 330. Also, when the current macroblock is an intra macroblock, the adder 360 may obtain the intra macroblock by using an intra prediction mode value.

The image processing apparatus 300 may configure a slice including at least one of an inter macroblock, an intra macroblock, or a skip macroblock, and may obtain a decoded frame including a plurality of slices.

In an embodiment of the disclosure, the area information generator 370 may obtain encoding information from the bitstream decoded by the entropy decoder 310. In an embodiment of the disclosure, the encoding information may include type information. The area information generator 370 may obtain the type information and may identify a type of the current macroblock based on the type information. The type information may be information indicating whether the macroblock is a skip macroblock, an intra macroblock, or an inter macroblock.

Alternatively, in an embodiment of the disclosure, the encoding information may further include a motion vector of an inter macroblock in addition to the type information.

In an embodiment of the disclosure, the area information generator 370 may generate area information by using the encoding information. In an embodiment of the disclosure, the area information may be information for identifying an area in which there is a difference between frames. In another embodiment of the disclosure, the area information may be information for identifying an area in which a difference between frames is equal to or greater than a certain reference value.

The area information generator 370 may generate, as the area information, information for distinguishing an area in which object recognition is to be performed from an area in which object recognition is not to be performed in each pixel of the frame.

In an embodiment of the disclosure, the area information may be a coordinate value indicating an area in which object recognition is to be performed or an area in which object recognition is not required. The area information generator 370 may generate, as the area information, a coordinate value of an area in which object recognition is to be performed in the decoded frame by using the type of the macroblock and may output the area information.

In an embodiment of the disclosure, the area information may be a lookup table corresponding to pixels included in the frame. That is, the area information may be a lookup table in which a lookup table value corresponding to a pixel of an area in which object recognition is to be performed and a lookup table value corresponding to a pixel of an area in which object recognition is not performed from among pixels included in the frame are different from each other. The area information generator 370 may generate a lookup table corresponding to each pixel of the decoded frame by using the type of the macroblock so that a lookup table value of each pixel is 1 or 0.

In an embodiment of the disclosure, when the area information generator 370 reads a macroblock type included in the bitstream and determines that the current macroblock is an inter macroblock, the area information generator 370 may obtain a motion vector of the inter macroblock. The area information generator 370 may set a lookup table value of a pixel of the inter macroblock to 1 or 0 according to whether a scalar value of the motion vector is equal to or greater than a certain value.

The area information generator 370 may generate a lookup table corresponding to one frame by collecting lookup tables for macroblocks, and may output the lookup table as the area information.

Figure 4:
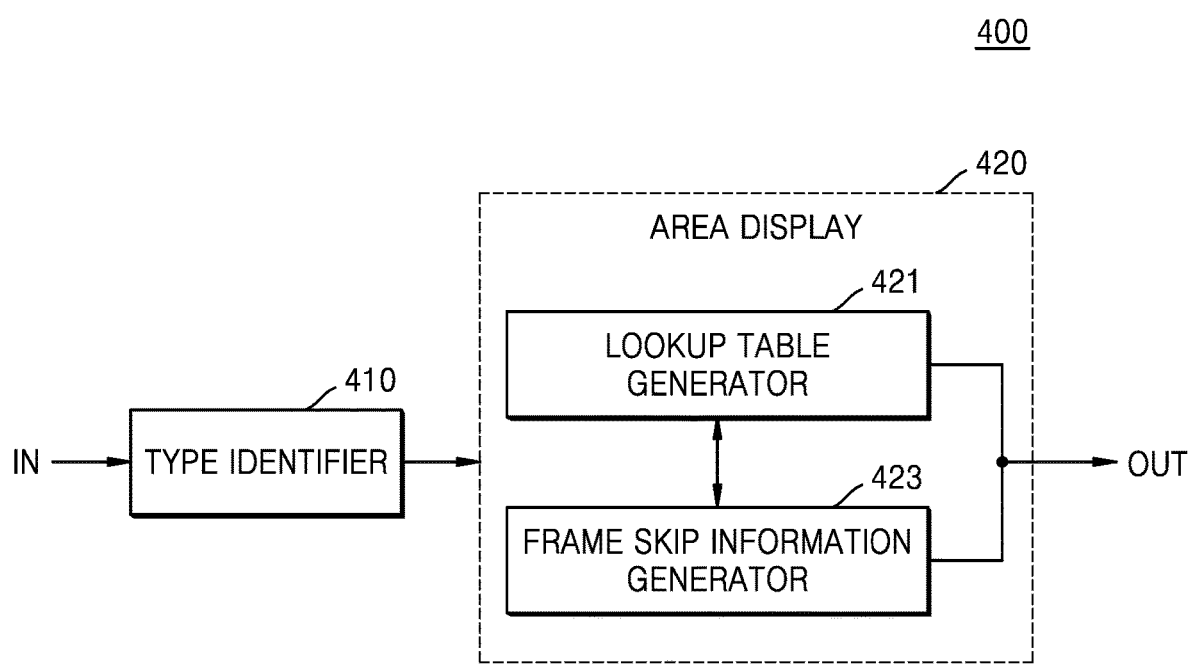
FIG. 4 is a block diagram of an area information generator according to an embodiment of the disclosure.

FIG. 4 is a block diagram of an area information generator 400 according to an embodiment of the disclosure. Referring to FIG. 4, the area information generator 400 may include a type identifier 410 and an area display 420. The area display 420 may include a lookup table generator 421 and a frame skip information generator 423.

The decoder 110 may obtain a frame by decoding an encoded image sequence, and in this process, the decoder 110 may obtain encoding information.

The type identifier 410 may receive the encoding information obtained by the decoder 110 (IN), and may identify a type of a macroblock by using the encoding information. The type identifier 410 may determine whether a current macroblock is a skip macroblock, an intra macroblock, or an inter macroblock, from type information included in the encoding information. For example, when the type identifier 410 obtains the skip indication 210, the type identifier 410 may determine that a certain number of macroblocks from the current macroblock are skip macroblocks. The type identifier 410 may obtain a macroblock type from the current macroblock, and may determine whether the current macroblock is an inter macroblock or an intra macroblock from the macroblock type. The type identifier 410 transmits the type of the current macroblock to the area display 420.

The area display 420 may generate area information for identifying a certain area of the frame according to the type of the current macroblock identified by the type identifier 410. The area information may be displayed as a coordinate value indicating a pixel included in the frame.

Alternatively, the area information may be provided as a lookup table corresponding to a pixel included in the frame. Although FIG. 4 will be described assuming that the area information includes a lookup table, the disclosure is not limited thereto.

The lookup table generator 421 may generate a lookup table corresponding to a pixel of the frame. The lookup table may include a value for each pixel included in the frame, or may include a value for a group of pixels included in the frame. A group of pixels may be, for example, a macroblock unit.

A lookup table value of the frame may be initialized to 0. The lookup table generator 421 may generate a lookup table having a value of 1 or 0, for each pixel or a group of pixels included in the frame, according to the type of the current macroblock received from the type identifier 410.

When the lookup table generator 421 receives information indicating that the current macroblock is a skip macroblock from the type identifier 410, the lookup table generator 421 may generate area information indicating not to perform an object recognition operation in a pixel corresponding to the skip macroblock included in the frame. In an embodiment of the disclosure, the lookup table generator 421 may maintain a lookup table value of the pixel of the skip macroblock as 0.

When consecutive skip macroblocks are included in the frame, the type identifier 410 may identify the number of consecutive skip macroblocks, and may notify the number to the lookup table generator 421. The lookup table generator 421 may maintain lookup table values of pixels of as many consecutive skip macroblocks as the identified number as 0.

When the lookup table generator 421 receives information indicating that the current macroblock is an intra macroblock from the type identifier 410, the lookup table generator 421 may change all lookup table values of pixels corresponding to the intra macroblock from among pixels included in the frame to 1, and may indicate that an object recognition operation is required in the intra macroblock.

When the lookup table generator 421 receives information indicating that the current macroblock is an inter macroblock from the type identifier 410, the lookup table generator 421 may generate area information indicating that an object recognition operation is to be performed in pixels corresponding to the inter macroblock from among pixels included in the frame. In an embodiment of the disclosure, the lookup table generator 421 may change all lookup table values of the pixels of the inter macroblock to 1.

In another embodiment of the disclosure, when the type identifier 410 determines that the current macroblock is an inter macroblock, the type identifier 410 may obtain a motion vector included in motion information of the inter macroblock. The type identifier 410 may determine whether a size of the motion vector of the inter macroblock is greater than a reference value, and may provide a determination result to the lookup table generator 421.

When the lookup table generator 421 receives information indicating that the current macroblock is an inter macroblock and a size of the motion vector of the inter macroblock is greater or less than a reference value from the type identifier 410, the lookup table generator 421 may maintain a lookup table value of a pixel of the inter macroblock as 0 or may change the lookup table value to 1 according to the size of the motion vector. That is, when the size of the motion vector is greater than the reference value, the lookup table generator 421 may change the lookup table value of the pixel of the inter macroblock to 1 and may store the changed lookup table value. When a motion vector value of the inter macroblock is greater than a certain reference value, then a similarity between the current macroblock and a macroblock located at the same position in a neighboring frame is likely to be low. Accordingly, the lookup table generator 421 may store the lookup table value of the pixel of the inter macroblock as 1 to perform an object recognition operation in the pixel corresponding to the inter macroblock.

In contrast, when a motion vector value of the inter macroblock is equal to or less than a certain reference value, then a similarity between the current macroblock and a macroblock at the same position in a neighboring frame is likely to be high. Accordingly, when the size of the motion vector is equal to or less than the reference value, the lookup table generator 421 may maintain the lookup table value of the pixel of the inter macroblock as 0.

The lookup table generator 420 may store a lookup table value of each macroblock in a memory in the lookup table generator 420, and may generate a final lookup table corresponding to one frame by collecting lookup table values of a plurality of macroblocks. The lookup table generator 420 may output the final lookup table corresponding to one frame as the area information (OUT).

The frame skip information generator 423 may generate frame skip information indicating to skip performing object recognition in a current frame when the number of pixels for performing object recognition in the current frame is less than a reference value by using the final lookup table generated by the lookup table generator 420. That is, when a difference between the current frame and a neighboring frame is small enough not to affect object recognition, the frame skip information generator 423 may generate information for skipping performing an object recognition operation in the frame.

The frame skip information generator 423 may determine whether the number of pixels, whose final lookup table values from among pixels included in the current frame are 1, is equal to or greater than a threshold number, and when the number is less than the threshold number, the frame skip information generator 423 may generate frame skip information and may output the frame skip information (OUT). When the frame skip information generator 423 outputs the frame skip information (OUT), the lookup table generator 423 may control the final lookup table not to be output. The frame skip information may include information for identifying a frame to be skipped and a flag for indicating not to perform an object recognition operation in the frame.

When the number of pixels, whose lookup table values are, 1 is equal to or greater than a threshold number, the frame skip information generator 423 may not generate frame skip information, and may control only the final lookup table for the current frame to be output.

The area display 420 may output the area information including at least one of the lookup table or the frame skip information (OUT).

As such, according to an embodiment of the disclosure, a lookup table for displaying an area in which object recognition is to be performed in a frame may be generated and output according to a type of a macroblock.

Also, according to an embodiment of the disclosure, when the number of pixels for performing object recognition in a frame is equal to or less than a threshold number, frame skip information indicating not to perform object recognition in the frame may be generated and output.

Figure 5:
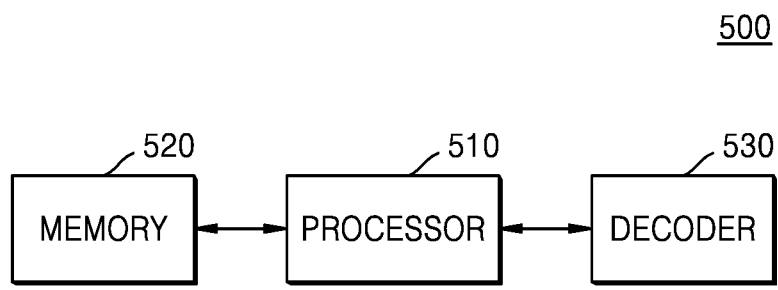
FIG. 5 is a block diagram of an image processing apparatus according to an embodiment of the disclosure.

FIG. 5 is a block diagram of an image processing apparatus 500 according to an embodiment of the disclosure. Referring to FIG. 5, the image processing apparatus 500 may include a processor 510, a memory 520, and a decoder 530.

The image processing apparatus 500 may be any of various electronic devices capable of decoding a compressed image and performing object recognition from the decoded image.

In an embodiment of the disclosure, the decoder 530 may obtain a reconstructed image by decoding an input image. The decoder 530 extracts a quantized transform block by decoding an input bitstream and inversely quantizes the quantized transform block, and reconstructs a residual block by inversely transforming the inversely quantized transform block. When a macroblock is an inter macroblock, the decoder 530 may extract a motion vector of a current block from the bitstream, and may reconstruct the macroblock by using the residual block and a prediction image. Also, when the macroblock is an intra macroblock, the decoder 530 may obtain information related to an intra prediction mode from the bitstream and may reconstruct the intra macroblock by using the information. The decoder 530 may reconstruct a frame by using reconstructed macroblocks.

The memory 520 according to an embodiment of the disclosure may store at least one instruction. The memory 520 may store at least one program executed by the processor 510. Also, the memory 520 may store data input to the image processing apparatus 500 or output from the image processing apparatus 500.

The memory 520 may store various programs and data for decoding a compressed image input to the image processing apparatus 500.

In an embodiment of the disclosure, the memory 520 may store a lookup table for each frame generated by the processor 510.

The memory 520 may include at least one type of storage medium of a flash memory type, a hard disk type, a multimedia card micro type, a card type memory (e.g., an SD or XD memory), a random-access memory (RAM), a static random-access memory (SRAM), a read-only memory (ROM), an electrically erasable programmable ROM (EEPROM), a programmable ROM (PROM), a magnetic memory, a magnetic disk, or an optical disk.

The processor 510 controls an overall operation of the image processing apparatus 500. The processor 510 may control the image processing apparatus 500 to perform a function, by executing at least one instruction stored in the memory 520.

In an embodiment of the disclosure, the processor 510 may obtain encoding information from a bitstream decoded by the decoder 530, by executing the at least one instruction. The encoding information may be information included in the bitstream and used to compress video data. The decoder 530 may decode the video data by using the encoding information.

The encoding information may include type information of a macroblock. The type information may include a skip indication and information indicating whether the macroblock is an intra macroblock or an inter macroblock. Also, the encoding information may include motion information of the inter macroblock.

In an embodiment of the disclosure, the processor 510 may identify a certain area in a frame, by using the type information of the macroblock included in the encoding information. In an embodiment of the disclosure, the processor 510 may generate a lookup table having a value of 1 or 0 for each pixel of the frame by using the type information of the macroblock, and may identify the certain area in the frame by using the lookup table.

In an embodiment of the disclosure, when the macroblock identified from the type information is a skip macroblock, the processor 510 may set a lookup table value of a pixel of the skip macroblock to 0. In an embodiment of the disclosure, the processor 510 may identify the number of consecutive skip macroblocks, and may set lookup table values of pixels of as many consecutive skip macroblocks as the identified number to 0.

In an embodiment of the disclosure, when the macroblock identified from the type information is an intra macroblock, the processor 510 may set a lookup table value of a pixel of the intra macroblock to 1.

In an embodiment of the disclosure, when the macroblock identified from the type information is an inter macroblock, the processor 510 may set a lookup table value of a pixel of the inter macroblock to 1 or 0 according to whether motion information of the inter macroblock satisfies a certain criterion. In an embodiment of the disclosure, when a size of a motion vector included in the motion information is equal to or less than a threshold value, the processor 510 may set a lookup table value of a pixel of the inter macroblock to 0, and when a size of a motion vector is greater than a threshold value, the processor 510 may set a lookup table value of a pixel of the inter macroblock to 1.

In an embodiment of the disclosure, the processor 510 may recognize an object from the frame decoded by the decoder 530, by using a trained model using at least one neural network. The neural network may be a set of algorithms for learning a method of recognizing an object from a certain image input to the neural network based on artificial intelligence. For example, the neural network may be trained to recognize an object from an image, based on supervised learning using a certain image as an input value, or based on unsupervised learning to find a pattern for recognizing an object from an image by self-learning a type of data needed to recognize an object from an image without supervision. Also, for example, the neural network may learn a method of recognizing an object from an image, by using reinforcement learning using a feedback about whether a result of recognizing an object through learning is correct.

Also, the neural network may perform an operation for inference and prediction according to artificial intelligence (AI) technology. That is, the neural network may be a deep neural network (DNN) in which an operation is performed through a plurality of layers. When multiple internal layers perform an operation, that is, when a depth of the neural network that performs an operation is increased, the neural network may be classified as a deep neural network (DNN). Also, a DNN operation may include a convolutional neural network (CNN) operation.

The processor 510 may implement a data recognition model for recognizing an object through a neural network, and may train the implemented data recognition model by using training data.

In an embodiment of the disclosure, the processor 510 may perform object recognition in a frame decoded from a compressed bitstream by the decoder 530, by using a trained model using at least one neural network. The processor 510 may analyze or classify an image of the input frame by using the trained data recognition model, and may analyze and classify an object included in the image.

For example, the processor 510 may recognize at least one object, e.g., a human face or a solid object, included in a frame, by performing a recognition operation through a DNN. The processor 510 may recognize a background or a place appearing in the frame in addition to the object included in the frame, by using a trained model. Objects the processor 510 recognizes may include, but are not limited to, what is included in the frame and a user may recognize as an independent object.

In an embodiment of the disclosure, the processor 510 may not perform object recognition in an entire frame, and may perform an object recognition operation only in an identified area in the frame. That is, the processor 510 may generate a lookup table for a target for performing an object recognition operation in a frame in advance and may perform pre-processing for identifying a certain area, and may perform object recognition only in the certain area from among pixels of the frame by using a neural network. The processor 510 may identify a pixel area whose lookup table value is 1 in the frame, may perform an object recognition operation by using the neural network only in the identified area, and may skip performing an object recognition operation in an unidentified area, that is, a pixel area whose lookup table value is 0. Accordingly, the amount of computation of data to be processed by the neural network may be reduced, and thus a processing speed may be increased.

In an embodiment of the disclosure, the processor 510 may perform an object recognition operation by using the neural network in the identified area in the frame only when the number of pixels whose lookup table values are 1 is equal to or greater than a threshold number. That is, when the number of pixels whose lookup table values are 1 is less than the threshold number, the processor 510 may prevent the neural network from performing an object recognition operation in the frame, thereby reducing the amount of computation of data to be processed by the neural network.

Figure 6:
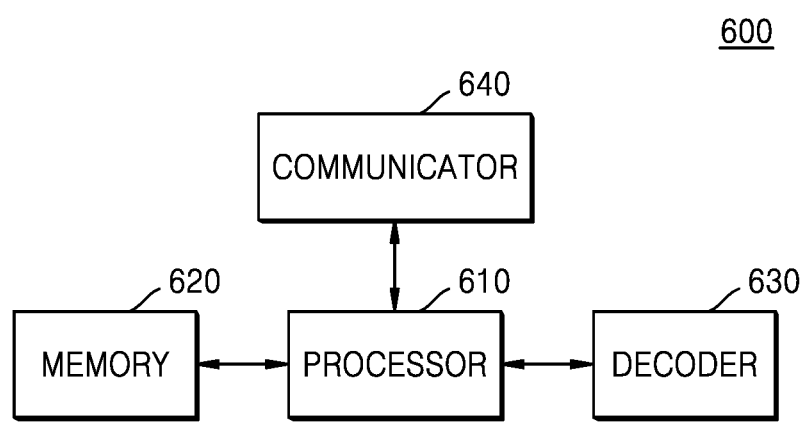
FIG. 6 is a block diagram of an image processing apparatus according to an embodiment of the disclosure.

FIG. 6 is a block diagram of an image processing apparatus 600 according to an embodiment of the disclosure. Referring to FIG. 6, the image processing apparatus 600 may include a processor 610, a memory 620, a decoder 630, and a communicator 640.

The memory 610 and the decoder 630 included in the image processing apparatus 600 of FIG. 6 perform functions similar to those of the memory 510 and the decoder 530 included in the image processing apparatus 500 of FIG. 5. Accordingly, descriptions redundant to those described with reference to FIG. 5 will be omitted.

The processor 610 controls an overall operation of the image processing apparatus 600, and may control the image processing apparatus 600 to perform a function by executing at least one instruction stored in the memory 620. The processor 610 may obtain encoding information from a bitstream obtained when the decoder 630 decodes a compressed image, may identify a certain area in a frame reconstructed by the decoder 630 by using the encoding information, and may generate area information indicating the certain area.

The processor 610 may generate a lookup table having a value of 1 or 0 for each pixel of the frame by using type information of a macroblock included in the encoding information, like the processor 510 included in the image processing apparatus 500 of FIG. 5.

In an embodiment of the disclosure, when the number of values of 1s from among lookup table values corresponding to pixels of the frame is equal to or less than a certain number, the processor 610 may generate frame skip information indicating to skip performing an object recognition operation in the frame.

The processor 610 may generate area information including a lookup table indicating a certain area for each frame and frame skip information indicating to skip performing an object recognition operation in a specific frame.

Unlike the processor 510 of FIG. 5, the processor 610 of FIG. 6 does not perform an object recognition operation. Instead, the image processing apparatus 600 may transmit area information and a decoded frame to an external computing device through the communicator 640, and the external computing device may perform an object recognition operation in an area identified by the area information in the decoded frame by using a neural network.

The communicator 640 may communicate with external devices through a wired and/or wireless network. In detail, the communicator 640 may transmit to and/or receive a signal from an external device connected through the wired and/or wireless network under the control of the processor 610. Examples of the external device may include a server, a server system, and a server-based device capable of processing data transmitted/received through the communicator 640.

The communicator 640 may include at least one communication module. The at least one communication module may include a communication module capable of transmitting and/or receiving data through a network according to a communication standard.

In an embodiment of the disclosure, the communicator 640 may communicate with a computing device that performs an object recognition operation in an image by using a neural network.

The computing device may perform object recognition in a frame received from the image processing apparatus 600 by using at least one neural network. In this configuration, the computing device may perform an object recognition operation in only an area identified by using area information transmitted by the image processing apparatus 600, without performing object recognition in the entire frame. That is, the computing device may perform an object recognition operation by using a neural network in only a pixel area whose lookup table value is 1 in the frame, and may skip performing an object recognition operation in an unidentified area, that is, a pixel area whose lookup table value is 0. Also, the computing device may skip performing an object recognition operation in a certain frame by using frame skip information.

As such, according to an embodiment of the disclosure, because area information indicating an area in which object recognition is to be performed is generated and is transmitted to an external computing device, the amount of computation and complexity performed by the external computing device may be reduced.

Figure 7:
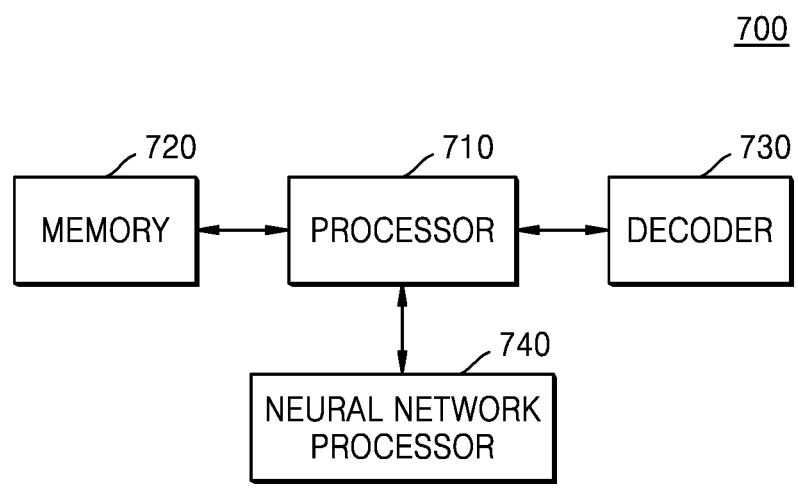
FIG. 7 is a block diagram of an image processing apparatus according to an embodiment of the disclosure.

FIG. 7 is a block diagram of an image processing apparatus 700 according to an embodiment of the disclosure. Referring to FIG. 7, the image processing apparatus 700 may include a processor 710, a memory 720, a decoder 730, and a neural network processor 740.

The memory 710 and the decoder 730 included in the image processing apparatus 700 of FIG. 7 perform functions similar to those of the memory 510 and the decoder 530 included in the image processing apparatus 500 of FIG. 5. Accordingly, descriptions redundant to those described with reference to FIG. 5 will be omitted.

The image processing apparatus 700 of FIG. 7 may further include the neural network processor 740, when compared to the image processing apparatus 500 of FIG. 5. That is, unlike the image processing apparatus 500 of FIG. 5, which performs an object recognition operation through a neural network, the image processing apparatus 700 of FIG. 7 may perform an object recognition operation through the neural network processor 740 that is separate from the processor 710.

The processor 710 may generate a lookup table for a target for performing an object recognition operation in a frame in advance by using encoding information. When the number of pixels for performing object recognition in the frame is equal to or less than a threshold number, the processor 710 may generate frame skip information indicating to skip object recognition in the frame. The processor 710 may transmit the area information including at least one of the lookup table or the frame skip information to the neural network processor 740, for each frame.

The neural network processor 740 may perform an object recognition operation through a neural network by executing one or more instructions stored in the memory 720 or in an internal memory of the neural network processor 740.

In an embodiment of the disclosure, the neural network processor 740 may perform object recognition in a frame decoded by the decoder 730, by using a trained model using one or more neural networks. The neural network processor 740 may implement a data recognition model for recognizing an object through a neural network, may train the implemented data recognition model by using training data, may analyze or classify an image of the input frame by using the trained data recognition model, and may analyze and classify an object included in the image. The neural network processor 740 may recognize an object, a background, or a place which may be recognized as an independent object by a user in the frame, by performing a recognition operation through a DNN.

In an embodiment of the disclosure, when the neural network processor 740 receives the lookup table from the processor 710, the neural network processor 740 may identify a certain area in the frame by using the lookup table, and may perform object recognition in only the certain area from among pixels of the frame. When the neural network processor 740 receives the frame skip information from the processor 710, the neural network processor 740 may skip performing an object recognition operation in the frame identified by the frame skip information.

Figure 8:
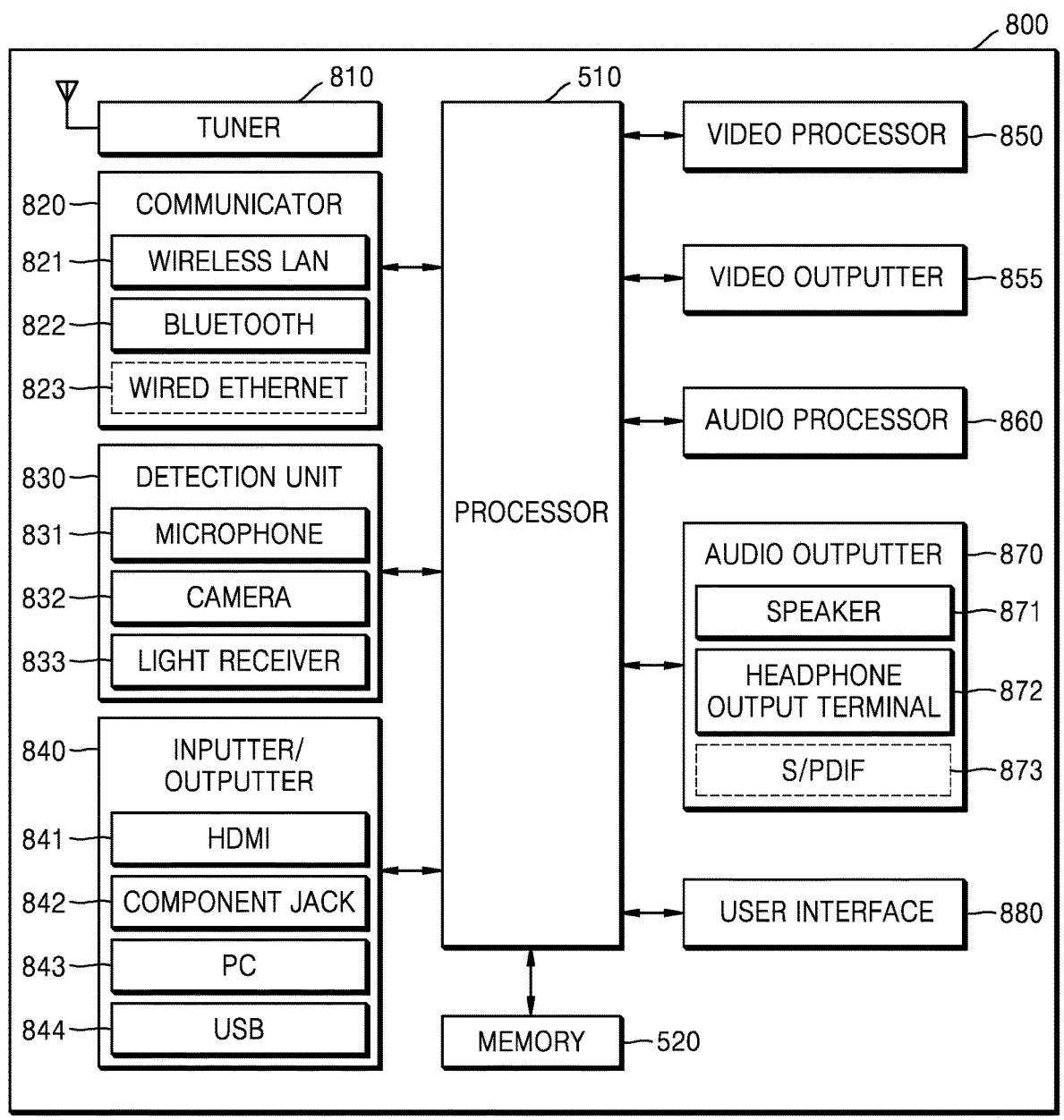
FIG. 8 is a block diagram of an image processing apparatus according to an embodiment of the disclosure.

FIG. 8 is a block diagram of an image processing apparatus 800 according to an embodiment of the disclosure. Referring to FIG. 8, the image processing apparatus 800 may include a tuner 810, a communicator 820, a detection unit 830, an input/output interface 840, a video processor 850, a video output 855, an audio processor 860, an audio output 870, and a user interface 880 in addition to the processor 510 and the memory 520.

The image processing apparatus 800 of FIG. 8 may include elements of the image processing apparatus 500 of FIG. 5. Accordingly, redundant descriptions for the processor 510 and the memory 520 with reference to FIG. 5 will be omitted. Also, the decoder 530 of FIG. 5 may be included in the tuner 810 or in the video processor 850 to perform a function of decoding a compressed image.

The tuner 810 may conduct amplification, mixing, or resonance on broadcast content received by wire or wirelessly to tune and select a frequency of a channel to be received by the image processing apparatus 800 from among many radio wave components. The content received through the tuner 810 is decoded into an audio, a video, and/or additional information. The audio, the video, and/or the additional information may be stored in the memory 520 under the control of the processor 510.

The communicator 820 may include at least one communication module such as a short-range communication module, a wired communication module, a mobile communication module, or a broadcast receiving module. The at least one communication module refers to a communication module capable of performing data transmission/reception through a network according to a communication standard such as a tuner for performing broadcast reception, Bluetooth, wireless local area network (WLAN), Wi-Fi, wireless broadband (Wibro), world interoperability for microwave access (Wimax), code-division multiple access (CDMA), or wideband code division multiple access (WCDMA).

The communicator 820 may connect the image processing apparatus 800 to an external device or a server under the control of the processor 510. The image processing apparatus 800 may download or browse a web for a program or an application required by the image processing apparatus 800 from the external device or the server through the communicator 820.

The communicator 820 may include one of wireless LAN 821, Bluetooth 822, and wired Ethernet 823 corresponding to the performance and structure of the image processing apparatus 800. Also, the communicator 820 may include a combination of the wireless LAN 821, the Bluetooth 822, and the wired Ethernet 823. The communicator 820 may receive a control signal through a control device such as a remote controller under the control of the processor 510. The control signal may be implemented as a Bluetooth type, an RF signal type, or a Wi-Fi type. The communicator 820 may further include another short-range communication (e.g., near-field communication (NFC) or Bluetooth low energy (BLE)) in addition to the Bluetooth 822. According to an embodiment of the disclosure, the communicator 820 may transmit/receive a connection signal to/from the external device or the like through short-range communication such as the Bluetooth 822 or BLE.

The detection unit 830 may detect a user's speech, image, or interaction, and may include a microphone 831, a camera 832, and a light receiver 833. The microphone 831 may receive an uttered speech of the user, and may convert the received speech into an electrical signal and may output the electrical signal to the processor 510. The camera 832 may include a sensor and a lens, and may capture an image formed on a screen. The light receiver 833 may receive an optical signal (including the control signal). The light receiver 833 may receive an optical signal corresponding to a user input (e.g., touch, press, touch gesture, speech, or motion) from a control device such as a remote controller or a mobile phone. The control signal may be extracted from the received optical signal under the control of the processor 510.

The input/output interface 840 may receive a video (e.g., a moving picture signal or a still image signal), an audio (e.g., a speech signal or a music signal), and additional information (e.g., a description, a title of content, or a location in which the content is stored) from a device outside the image processing apparatus 800 under the control of the processor 510. The input/output interface 840 may include one of a high-definition multimedia interface (HDMI) port 841, a component jack 842, a PC port 843, and a USB port 844. The inputter/outputter 840 may include a combination of the HDMI port 841, the component jack 842, the PC port 843, and the USB port 844.

The video processor 850 may process image data to be displayed by video output 855, and may perform any of various image processing operations such as decoding, rendering, scaling, noise filtering, frame rate conversion, or resolution conversion on the image data.

The video output 855 may display content received from a broadcasting station, an external server, or an external storage medium, or a video signal received through the HDMI port 841 on a screen. The content that is a media signal may include a video signal or a text signal.

When the video output 855 is implemented as a touch-screen, the video output 855 may be used as an input device as well as an output device. The video outputter 855 may include at least one of a liquid crystal display, a thin-film transistor-liquid crystal display, an organic light-emitting diode, a flexible display, a three-dimensional (3D) display, or an electrophoretic display. According to a configuration of the image processing apparatus 800, the image processing apparatus 800 may include two or more video outputs 855.

The audio processor 860 processes audio data. The audio processor 860 may perform any of various processing operations such as decoding, amplification, or noise filtering on the audio data.

The audio output 870 may output an audio included in content received through the tuner 810, an audio input through the communicator 820 or the input/output interface 840, and an audio stored in the memory 520 under the control of the processor 510. The audio output 870 may include at least one of a speaker 871, a headphone output terminal 872, or a Sony/Philips digital interface (S/PDIF) output terminal 873.

The user interface 880 may receive a user input for controlling the image processing apparatus 800. The user interface 880 may include any of various user input devices such as, but not limited to, a touch panel for detecting a touch of a user, a button for receiving a push operation of the user, a wheel for receiving a rotation operation of the user, a keyboard, a dome switch, a microphone for speech recognition, and a motion detection sensor for sensing a motion. Also, when the image processing apparatus 800 is operated by a remote controller, the user interface 880 may receive a control signal from the remote controller.

Figure 9:
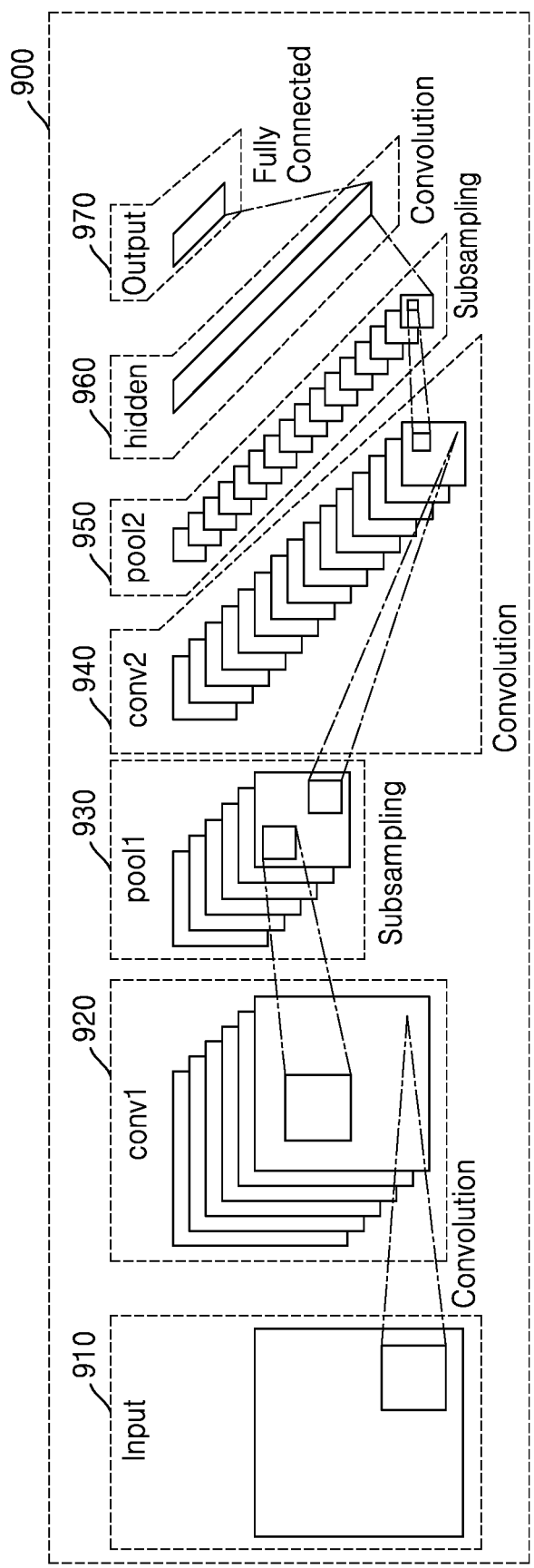
FIG. 9 is a diagram for describing a neural network for performing object recognition according to an embodiment of the disclosure.

FIG. 9 is a diagram for describing a neural network for performing object recognition according to an embodiment of the disclosure. FIG. 9 illustrates a neural network used in an embodiment of the disclosure.

The processor 510 may generate output data, by using a convolutional neural network (CNN), a deep convolutional neural network (DCNN), or a Capsnet neural network. The DCNN and the Capsnet may also be CNN-based neural networks.

When correlation among pieces of information included in an image is local, a CNN-based neural network may introduce a filter applied only to a specific area, may perform convolution on pieces of information in the filter, and may generate output data.

FIG. 9 illustrates a CNN-based neural network 900. In detail, FIG. 9 illustrates a deep convolutional neural network (DCNN) including a plurality of layers and having a plurality of depths. The processor 510 may recognize an object in a frame through the CNN-based neural network 900 and may output a result of the object recognition.

In an embodiment of the disclosure, a frame reconstructed from a compressed image may be input to an input layer 910 of the CNN-based neural network 900. In this configuration, the frame input to the input layer 910 of the CNN-based neural network 900 may not be the entire frame, but only pixel values of a certain area identified by a lookup table may be input. In the CNN-based neural network 900, convolution layers and pooling layers may be alternately arranged, and a depth of each layer filter increases from left to right. Also, a last layer of the CNN-based neural network 900 may be formed as a fully connected layer.

In an embodiment of the disclosure, the CNN-based neural network 900 may previously identify an area for performing an object recognition operation in a frame by referencing to a lookup table for the frame, and may apply a filter only to the identified area. Accordingly, the CNN-based neural network 900 may perform a convolution operation only in the identified area, without performing an operation on all pixels of the input frame.

The convolution layer is a layer of data generated according to a convolution operation, and the pooling layer is a layer for reducing the number or a size of data through an operation such as sub-sampling or pooling. Data (e.g., a feature map) indicating a feature of the input frame is generated while passing through the convolution layer and the pooling layer. The data generated by passing through the convolution layer and the pooling layer is processed through a hidden layer formed as a fully connected layer, and result data for an object recognized from features may be output.

For example, the CNN-based neural network 900 may include the input layer 910, a first convolution layer 920, a first pooling layer 930, a second convolution layer 940, a second pooling layer 950, a hidden layer 960, and an output layer 970. Depths of the convolution layer and the pooling layer may be variable, and a depth of the hidden layer may also be variable. Also, as depths of the convolution layer and the pooling layer increase, more accurate output data may be obtained. This is because, as depths of the convolution layer and the pooling layer increase, pieces of information indicating features of an input image represent more detailed features of the input image and thus an object recognized from the features may be more accurately recognized. Also, a depth and a shape of the CNN-based neural network 900 may be diversely designed in consideration of the accuracy and reliability of a result, an operation processing speed and capacity of a processor.

Figure 10:
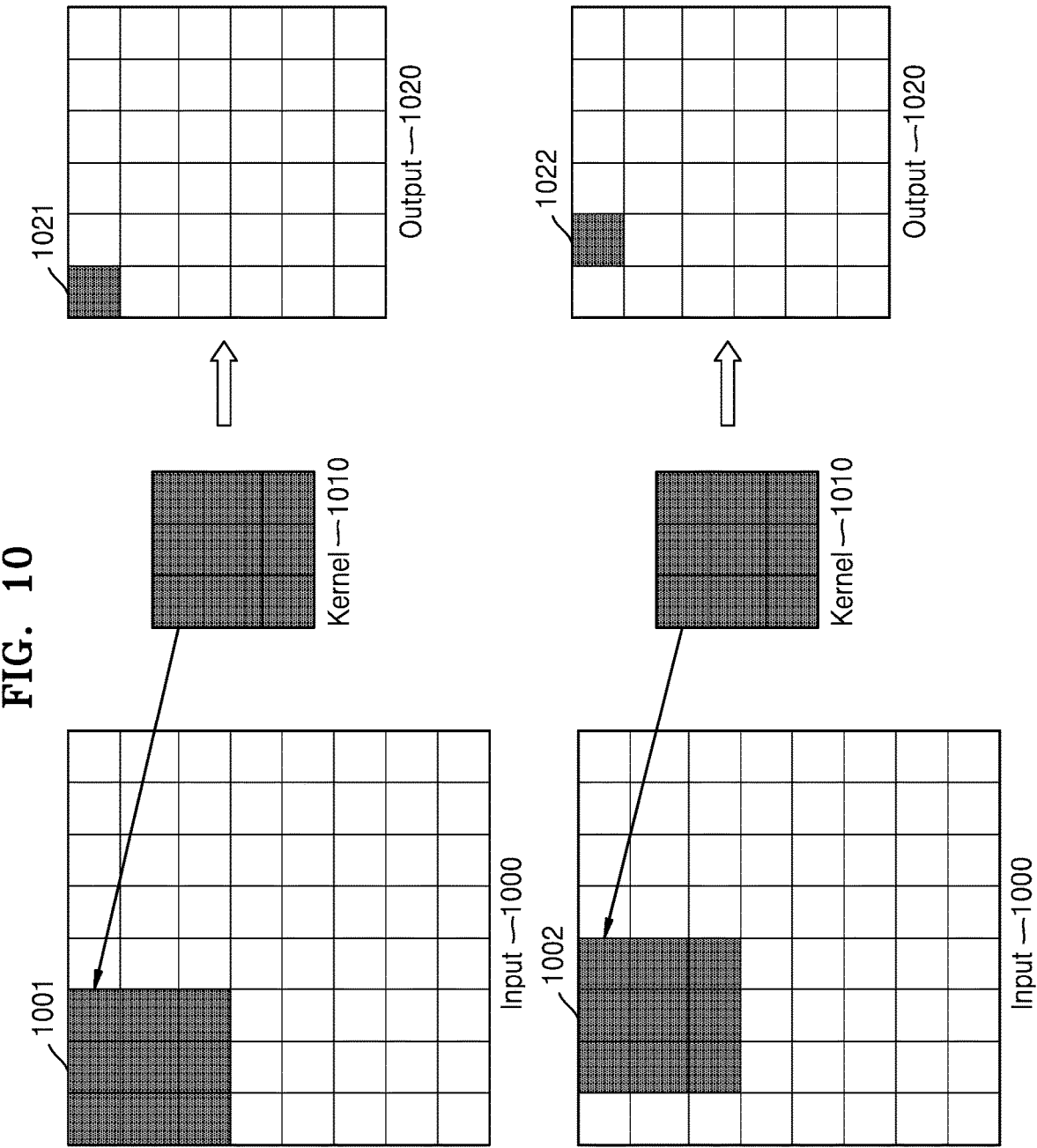
FIG. 10 is a diagram for simplifying and describing a process by which a neural network performs a convolution operation in a convolution layer according to an embodiment of the disclosure.

FIG. 10 is a diagram for simplifying and describing a process by which a neural network performs a convolution operation in a convolution layer according to an embodiment of the disclosure. Referring to FIG. 10, for example, input data 1000 of a convolution layer has a size of 8*8. For example, a size of a kernel applied to the input data 1000 is 3*3 (horizontal*vertical) and the number of kernels is n.

Referring to FIG. 10, a neural network extracts a feature of input data, by applying a kernel 1010 from an upper left corner to a lower right corner of the input data 1000. For example, the neural network may perform a convolution operation by applying the kernel 1010 to pixels included in a lower left 3*3 area 1001 of the input data 1000. The neural network may generate one pixel value 1021 mapped to the upper left 3*3 area 1001, by multiplying and adding pixel values included in the upper left 3*3 area 1001 and weight values included in the kernel 1010.

Also, the neural network may generate one pixel value 1022 mapped to a 3*3 area 1002, which is moved rightward by one pixel from the upper left 3*3 area 1001 of the input data 1000, by multiplying and adding pixel values included in the 3*3 area and weight values included in the kernel 1010.

In the same manner, the neural network may generate pixel values, by multiplying and adding weight values included in the kernel 1010, while scanning a target of a convolution operation in the input data 1000 from left to right and from top to bottom pixel by pixel. Accordingly, a 6*6 feature map may be output as output data 1020.

In an embodiment of the disclosure, instead of outputting a result value while scanning pixels included in the entire input data 1000 one by one, the neural network may obtain an area in which object recognition is to be performed by referencing a lookup table and may perform a convolution operation in only the area. That is, the neural network may perform a convolution operation in only pixels whose lookup table values are 1 from among pixels of the input data 1000, and may skip performing a convolution operation in pixels whose lookup table values are 0. For example, when there are pixels to be skipped from among pixels included in a certain 3*3 area of the input data 1000 in a process of obtaining output data by multiplying and adding pixel values included in the certain 3*3 area of the input data 1000 and weight values included in the kernel 1010, the neural network of FIG. 10 may perform an operation by setting pixel values of the pixels to 0. Accordingly, when a pixel to be skipped in the input data 100 is known and an operation in the pixel is skipped, the amount of computation and time required for a convolution operation are significantly reduced.

Although data that is a target of a convolution operation may be scanned while moving by one pixel, the data may be scanned while moving by two or more pixels. The number of pixels by which input data moves in a scanning process is referred to as a stride, and a size of an output feature map may be determined according to a size of the stride.

Referring to FIG. 10, because the input data 1000 has a size of 8*8 and the output data 1020 has a size of 6*6, a size of the output data 1020 is less than a size of the input data 1000. A CNN includes multiple convolution layers, and a size of data is continuously reduced while passing through the multiple convolution layers. In this configuration, when a size of data is reduced before a feature is not sufficiently extracted, the feature of input data may be missing. Accordingly, to prevent the problem, padding may be performed.

Although only a convolution operation result of one kernel 1010 is illustrated in FIG. 10, when a convolution operation is performed on n kernels, n feature maps may be output. That is, the number of channels of output data may be determined according to the number (n) of kernels, and accordingly, the number of channels of input data in a next layer may also be determined.

Figure 11:
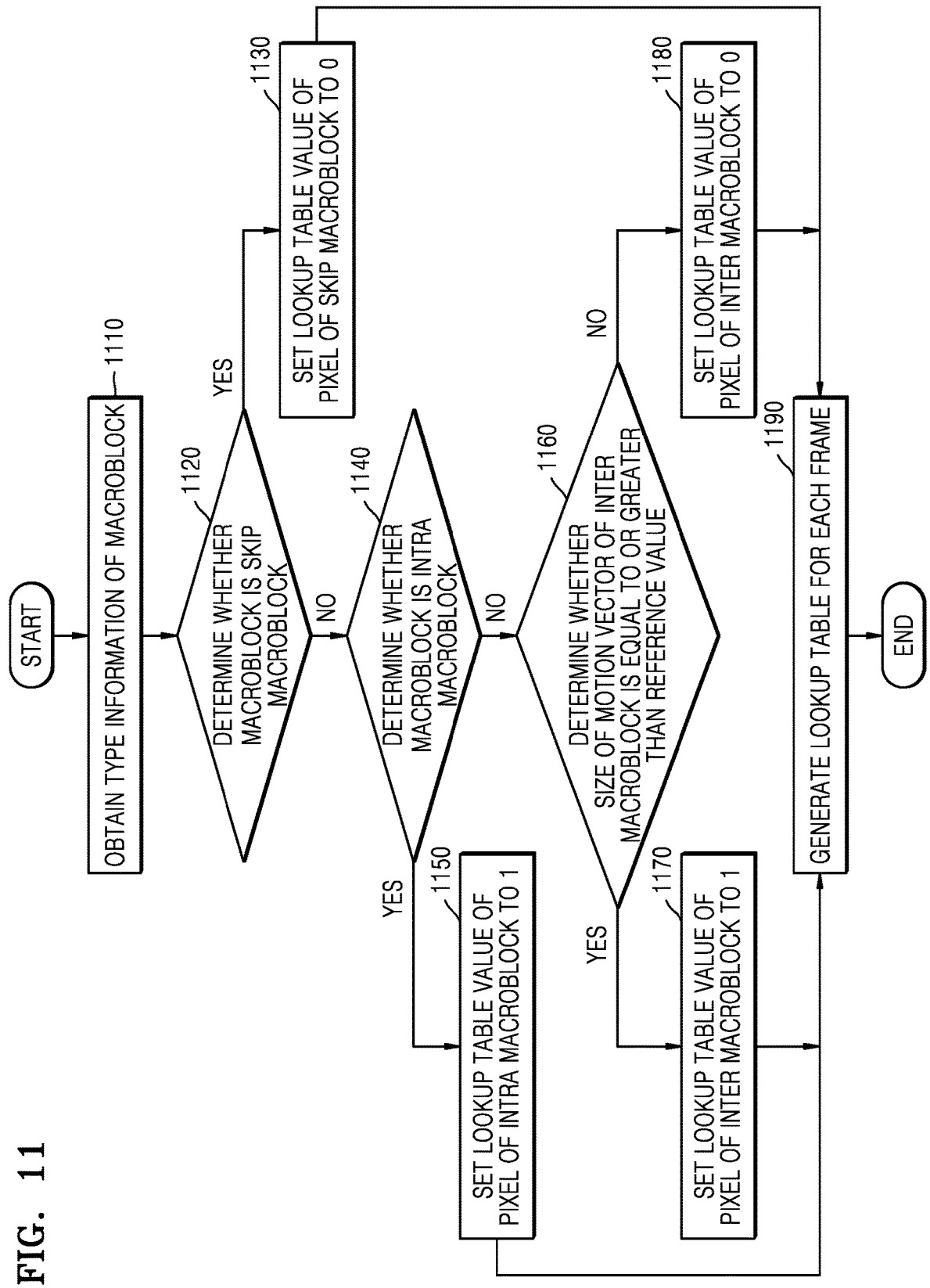
FIG. 11 is a flowchart illustrating a process of generating a lookup table according to an embodiment of the disclosure.

FIG. 11 is a flowchart illustrating a process of generating a lookup table according to an embodiment of the disclosure. Referring to FIG. 11, the decoder 110 of FIG. 1 may obtain encoding information from a bitstream decoded from an encoded image. In an embodiment of the disclosure, the area information generator 120 may generate area information by using part of the encoding information obtained by the decoder 110.

The area information generator 120 may obtain type information of each macroblock from the encoding information (operation 1110). The type information of each macroblock may be information indicating whether a current macroblock is a skip macroblock, an inter macroblock, or an intra macroblock.

When a skip indication is included in the type information, the area information generator 120 may determine that the current macroblock is a skip macroblock (operation 1120). When the current macroblock is a skip macroblock, the area information generator 120 may set a lookup table value of a pixel of the skip macroblock to 0 (operation 1130).

When the current macroblock is not a skip macroblock, the area information generator 120 may read a type included in the macroblock and may determine whether the macroblock is an intra macroblock (operation 1140). When the current macroblock is an intra macroblock, the area information generator 120 may set a lookup table value of a pixel of the intra macroblock to 1 (operation 1150).

When the current macroblock is an inter macroblock, the area information generator 120 may obtain a motion vector of the inter macroblock. The area information generator 120 may determine whether a size of the motion vector of the inter macroblock is equal to or greater than a threshold value (operation 1160).

When a size of the motion vector is equal to or greater than a threshold value, the area information generator 120 may set a lookup table value of a pixel of the inter macroblock to 1 (operation 1170).

When a size of the motion vector is less than a threshold value, the area information generator 120 may set a lookup table value of a pixel of the inter macroblock to 0 (operation 1180).

The area information generator 120 may generate a lookup table including at least one of the skip macroblock, the intra macroblock, or the inter macroblock. The area information generator 120 may generate a final lookup table of a corresponding frame, for each frame (operation 1190).

Figure 12:
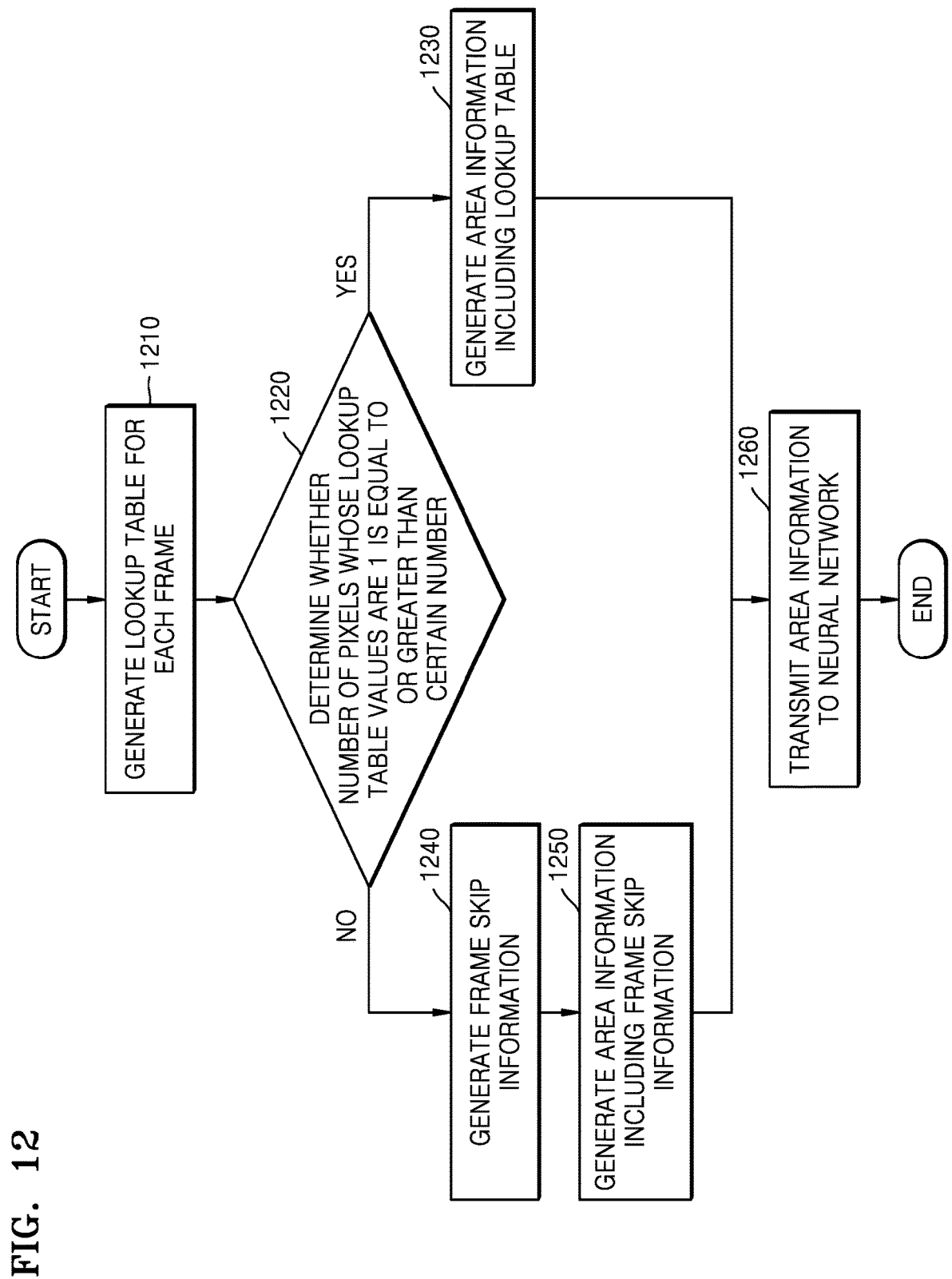
FIG. 12 is a flowchart illustrating a process of generating a lookup table according to an embodiment of the disclosure.

FIG. 12 is a flowchart illustrating a process of generating a lookup table according to an embodiment of the disclosure. Referring to FIG. 12, the area information generator 120 may generate a lookup table for each frame (operation 1210). The area information generator 120 may generate a lookup table according to a process described with reference to FIG. 11.

The area information generator 120 may determine whether the number of pixels whose lookup table values are 1 in the lookup table generated for each frame is equal to or greater than a threshold number (operation 1220). When the number of pixels whose lookup table values are 1 is equal to or greater than a threshold number, the area information generator 120 may generate area information including the lookup table (operation 1230).

When the number of pixels whose lookup table values are 1 is not equal to or greater than a threshold number, the area information generator 120 may generate frame skip information (operation 1240). The frame skip information may be an identifier indicating that object recognition does not need to be performed in a current frame. The frame skip information may include, but is not limited to, information for identifying a frame to be skipped and a flag indicating not to perform an object recognition operation in the frame. The area information generator 120 may generate area information including the frame skip information (operation 1250).

The area information generator 120 may transmit the generated area information to the object recognizer 130. In more detail, the area information generator 120 may transmit the area information to a neural network included in the object recognizer 130 (operation 1260).

Figure 13:
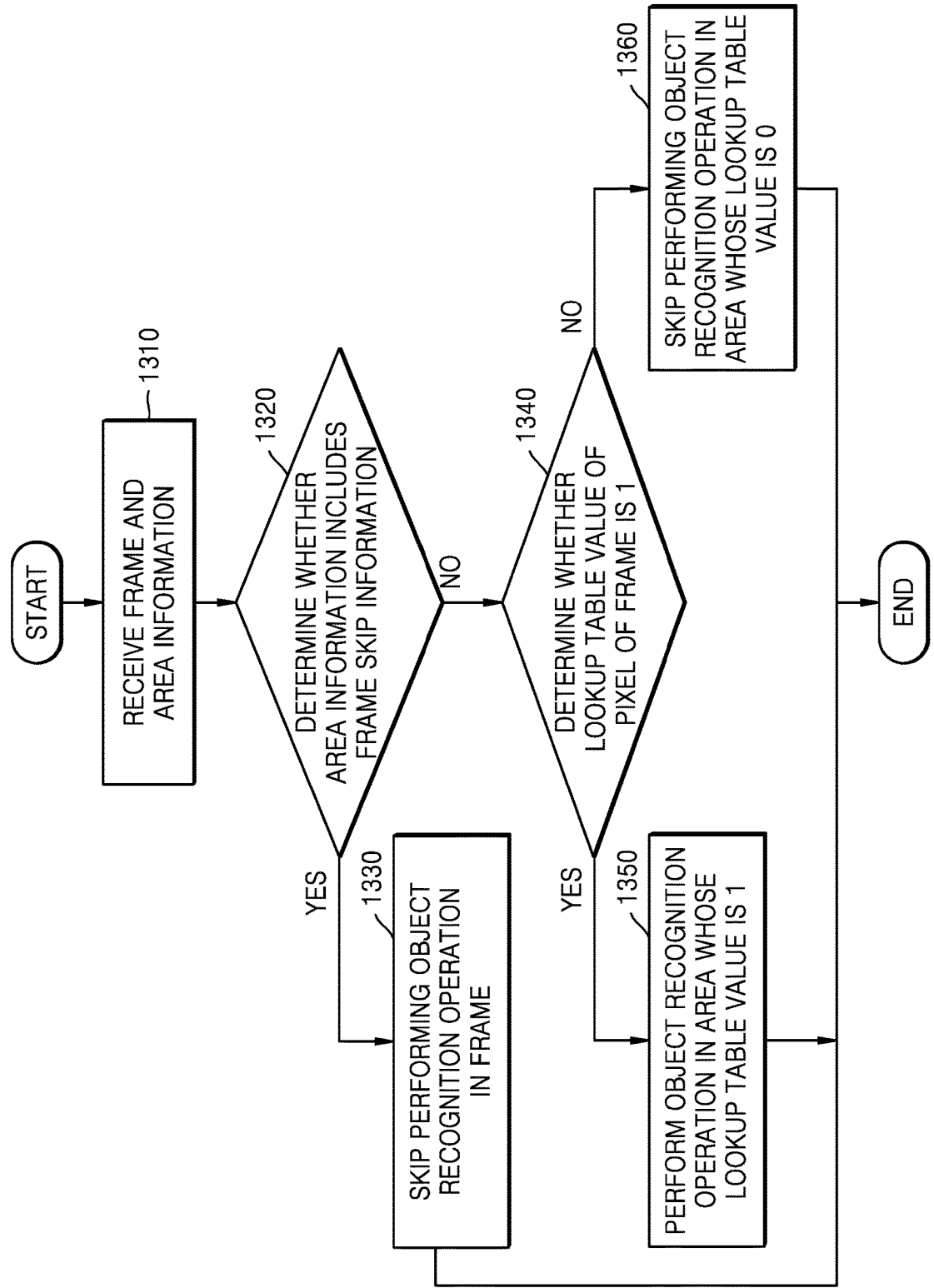
FIG. 13 is a flowchart illustrating a process of performing object recognition according to an embodiment of the disclosure.

FIG. 13 is a flowchart illustrating a process of performing object recognition according to an embodiment of the disclosure. Referring to FIG. 13, a neural network may receive a frame for performing object recognition and area information about the frame (operation 1310).

In an embodiment of the disclosure, the neural network may be included in the object recognizer 130 of FIG. 1, the processor 510 of FIG. 5, or the neural network processor 740 of FIG. 7. Alternatively, the neural network may be included in an external computing device through the communicator 640 of FIG. 6.

In an embodiment of the disclosure, the area information that is information indicating an area in which object recognition is to be performed may include at least one of a lookup table or frame skip information.

The neural network may determine whether frame skip information is included in the area information (operation 1320). When frame skip information for a certain frame is included in the area information, the neural network may skip performing an object recognition operation in the certain frame (operation 1330).

When frame skip information for a certain frame is not included in the area information, the neural network may obtain a lookup table of the frame and may identify a pixel whose lookup table value is 1 (operation 1340). The neural network may perform an object recognition operation in an area whose lookup table value is 1 (operation 1350).

When there is an area whose lookup table value is 0, the neural network may skip performing an object recognition operation in the area (operation 1360).

As such, according to an embodiment of the disclosure, instead of performing an object recognition operation by scanning an entire frame, a neural network performs object recognition in only an area identified by area information or skips performing an object recognition operation in an entire specific frame, thereby making it possible to perform object recognition at a higher speed with a smaller amount of computation.

Figure 14:
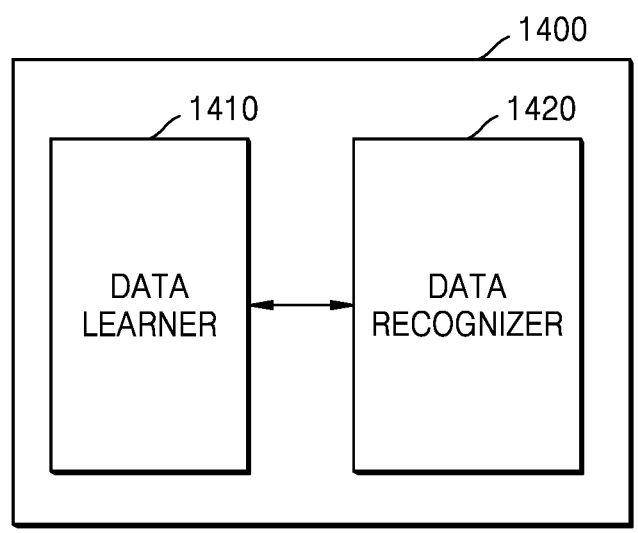
FIG. 14 is a block diagram illustrating a configuration of a computing device according to an embodiment of the disclosure.

FIG. 14 is a block diagram illustrating a configuration of a computing device 1400 according to an embodiment of the disclosure. The computing device 1400 of FIG. 14 may be a device for performing an object recognition operation by using a neural network.

A data learner 1410 may learn a criterion for recognizing an object from a frame. The data learner 1410 may learn a criterion about which information of an image is to be used to determine the object in the frame. Also, the data learner 1410 may learn a criterion about how to recognize the object by using the information of the image. The data learner 1410 may obtain data to be used for training, and may apply the obtained data to a data recognizer 1420.

The data recognizer 1420 may recognize at least one object from the frame, and may output a recognition result. The data recognizer 1420 may recognize at least one object from a certain frame, by using a trained data recognition model. The data recognizer 1420 may obtain data for the object according to a criterion that is pre-set by training, and may use the data recognition model using the obtained data as an input value. The data recognizer 1420 may recognize at least one object in the frame, by using the data recognition model. Also, a result value output by the data recognition model using the obtained information for the object as an input value may be used to update the data recognition model.

At least one of the data learner 1410 or the data recognizer 1420 may be manufactured as at least one hardware chip and may be mounted on an electronic device. For example, at least one of the data learner 1410 or the data recognizer 1420 may be manufactured as a dedicated hardware chip for artificial intelligence (AI), or may be manufactured as a part of an existing general-purpose processor (e.g., a central processing unit (CPU) or an application processor) or a graphics processor (e.g., a graphics processing unit (GPU)) and may be mounted on any of the various electronic devices.

In this configuration, the data learner 1410 and the data recognizer 1420 may be mounted on one electronic device, or may be respectively mounted on separate electronic devices. For example, one of the data learner 1410 and the data recognizer 1420 may be included in an electronic device, and the remaining one may be included in a server. Also, model information established by the data learner 1410 may be provided to the data recognizer 1420 and data input to the data recognizer 1420 may be provided as additional training data to the data learner 1410 by wire or wirelessly.

At least one of the data learner 1410 or the data recognizer 1420 may be implemented as a software module. When at least one of the data learner 1410 or the data recognizer 1420 is implemented as a software module (or a program module including instructions), the software module may be stored in a non-transitory computer-readable recording medium. Also, in this configuration, at least one software module may be provided by an operating system (OS) or a certain application. Alternatively, a part of at least one software module may be provided by an OS, and the remaining part may be provided by a certain application, FIG. 15 is a block diagram of the data learner 1410 according to an embodiment of the disclosure.

Figure 15:
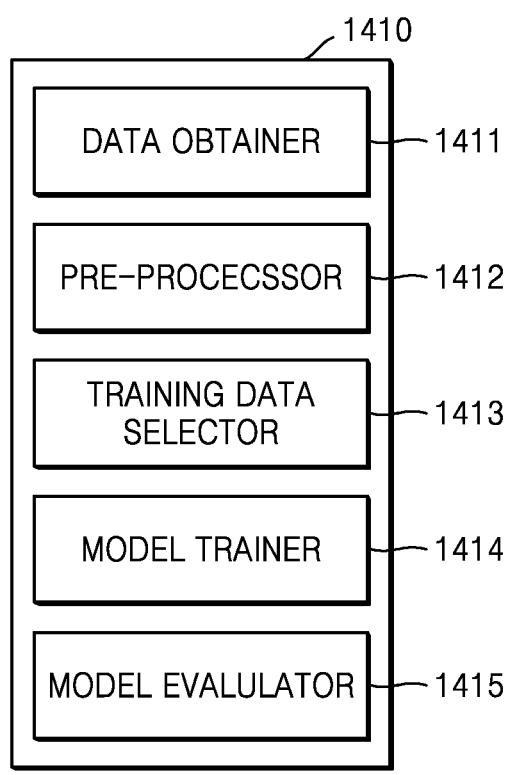
FIG. 15 is a block diagram of a data learner according to an embodiment of the disclosure.

Referring to FIG. 15, the data learner 1410 according to an embodiment of the disclosure may include a data obtainer 1411, a pre-processor 1412, a training data selector 1413, a model trainer 1414, and a model evaluator 1415.

The data obtainer 1411 may obtain data needed for training for recognizing an object in a frame. The data obtainer 1411 may obtain data from an external server such as a social network server, a cloud server, or a content providing server.

The data obtainer 1411 may obtain an image for training a model to recognize an object in a frame. For example, the data obtainer 1411 may obtain an image from at least one external device connected through a network, or may obtain an image by extracting at least one scene from content displayed by the image processing apparatus 500.

The pre-processor 1412 may pre-process obtained data, so that the obtained data is to be used for training to recognize at least one object in a frame. The pre-processor 1412 may process the obtained data into a preset format, so that the model trainer 1414 that will be described below uses the obtained data obtained for training for recognizing at least one object in a frame. For example, the pre-processor 1412 may, but is not limited to, analyze the obtained image and may detect attribute information of the image.

The training data selector 1413 may select data needed for training from among pre-processed data. The selected data may be provided to the model trainer 1414. The training data selector 1413 may select data needed for training from among the pre-processed data, according to a preset criterion for recognizing an object from an image. Also, the training data selector 1413 may select data according to a criterion that is pre-set by training by the model trainer 1414 that will be described below.

The model trainer 1414 may learn a criterion about which training data is to be used, to recognize the object from the image. For example, the model trainer 1414 may learn a type, the number, or a level of image attributes used to recognize the object from the image.

Also, the model trainer 1414 may train a data recognition model used to identify at least one object from an image by using training data. In this configuration, the data recognition model may be a model that is previously established. For example, the data recognition model may be a model that is previously established by receiving basic training data (e.g., a sample image).

The data recognition model may be established in consideration of a field to which a recognition model is applied, the purpose of training, or the computer performance of a device. The data recognition model may be a model based on, for example, a neural network. For example, a model such as, but not limited to, a deep neural network (DNN), a recurrent neural network (RNN), or a bidirectional recurrent deep neural network (BRDNN) may be used as the data recognition model.

According to various embodiments of the disclosure, when a plurality of data recognition models that are previously established exist, the model trainer 1414 may determine a data recognition model having a high relationship between input training data and basic training data as a data recognition model to be trained. In this configuration, the basic training data may be previously classified according to types of data, and the data recognition models may be previously established according to the types of data. For example, the basic training data may be previously classified based on various criteria such as a region in which training data is generated, a time when the training data is generated, a size of the training data, a genre of the training data, a generator of the training data, and a type of an object in the training data.

Also, the model trainer 1414 may train the data recognition model by using a learning algorithm including, for example, error back-propagation or gradient descent.

Also, the model trainer 1414 may train the data recognition model through, for example, supervised learning using training data as an input value. Also, the model trainer 1414 may train the data recognition model, through unsupervised learning to find a criterion for determining a state of a user, by self-learning a type of data needed to determine the state of the user without supervision. Also, the model trainer 1414 may train the data recognition model, through reinforcement learning using a feedback about whether a result of determining the state of the user according to training is right.

Also, when the data recognition model is trained, the model trainer 1414 may store the trained data recognition model. In this configuration, the model trainer 1414 may store the trained data recognition model in a memory of a device including the data recognizer 1420. Alternatively, the model trainer 1414 may store the trained data recognition model in a memory of a device including the data recognizer 1420 that will be described below. Alternatively, the model trainer 1414 may store the trained data recognition model in a memory of a server connected to an electronic device through a wired or wireless network.

In this configuration, the memory in which the trained data recognition model is stored may also store a command or data related to at least another element of the device. Also, the memory may also store software and/or a program. The program may include, for example, a kernel, middleware, an application programming interface (API), and/or an application program (or "application").

When the model evaluator 1415 inputs evaluation data to the data recognition model and a recognition result output from the evaluation data does not satisfy a certain criterion, the model evaluator 1415 may cause the model trainer 1414 to perform training again. In this configuration, the evaluation data may be preset data for evaluating the data recognition model.

For example, from among recognition results of the trained data recognition model trained for the evaluation data, when the number or a ratio of recognition results that are not accurate exceeds a preset threshold value, the model evaluator 1415 may evaluate that the certain criterion is not satisfied. For example, when 2% is defined as the certain criterion and wrong recognition results are output from more than 20 pieces of evaluation data from among 1000 pieces of evaluation data, the model evaluator 1415 may evaluate that the trained data recognition model is not suitable.

When a plurality of trained data recognition models exists, the model evaluator 1415 may evaluate whether each of the trained data recognition models satisfies a certain criterion, and may determine a model satisfying the certain criterion as a final data recognition model. In this configuration, when a plurality of models satisfy the certain criterion, the model evaluator 1415 may determine one or a certain number of models that are previously set in a descending order of evaluation scores as final data recognition models.

At least one of the data obtainer 1411, the pre-processor 1412, the training data selector 1413, the model trainer 1414, or the model evaluator 1415 in the data learner 1410 may be manufactured as at least one hardware chip and may be mounted on an electronic device. For example, at least one of the data obtainer 1411, the pre-processor 1412, the training data selector 1413, the model trainer 1414, or the model evaluator 1415 may be manufactured as a dedicated hardware chip for artificial intelligence (AI), or may be manufactured as a part of an existing general-purpose processor (e.g., a CPU or an application processor) or a graphics processor (e.g., a GPU) and may be mounted on any of various electronic devices.

Also, the data obtainer 1411, the pre-processor 1412, the training data selector 1413, the model trainer 1414, and the model evaluator 1415 may be mounted on one electronic device, or may be respectively provided in separate electronic devices. For example, some of the data obtainer 1411, the pre-processor 1412, the training data selector 1413, the model trainer 1414, and the model evaluator 1415 may be included in an electronic device, and the remaining ones may be included in a server.

Also, at least one of the data obtainer 1411, the pre-processor 1412, the training data selector 1413, the model trainer 1414, or the model evaluator 1415 may be implemented as a software module. When at least one of the data obtainer 1411, the pre-processor 1412, the training data selector 1413, the model trainer 1414, or the model evaluator 1415 is implemented as a software module (or a program module including instructions), the software module may be stored a non-transitory computer-readable recording medium. Also, in this configuration, at least one software module may be provided by an operating system (OS) or a certain application. Alternatively, a part of at least one software module may be provided by an OS, and the remaining part may be provided by a certain application.

Figure 16:
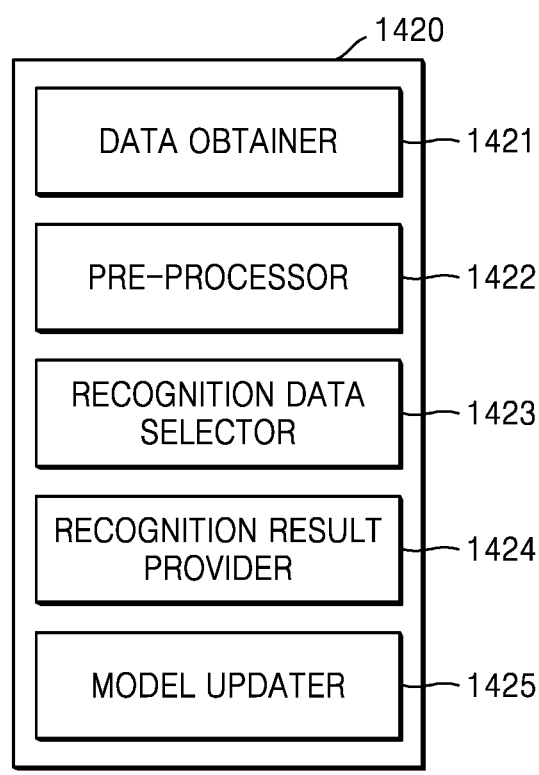
FIG. 16 is a block diagram illustrating a configuration of a data recognizer according to an embodiment of the disclosure.

FIG. 16 is a block diagram illustrating a configuration of the data recognizer 1420 according to an embodiment of the disclosure.

Referring to FIG. 16, the data recognizer 1420 according to some embodiments of the disclosure may include a data obtainer 1421, a pre-processor 1422, a recognition data selector 1423, a recognition result provider 1424, and a model updater 1425.

The data obtainer 1421 may obtain data needed to recognize an object from an image, and the pre-processor 1422 may pre-process the obtained data so that the data obtained to recognize the object from the image is used. The pre-processor 1422 may process the obtained data into a pre-set format, so that the recognition result provider 1424 that will be described below uses the data obtained to recognize the object from the image.

The recognition data selector 1423 may select data needed to recognize the object from the image from among pieces of pre-processed data. The selected data may be provided to the recognition result provider 1424. The recognition data selector 1423 may select some or all of the pieces of pre-processed data, according to a preset criterion for recognizing the object from the image.

The recognition result provider 1424 may recognize the object from the image by applying the selected data to a data recognition model. The recognition result provider 1424 may provide a recognition result according to a recognition target. The recognition result provider 1424 may apply the selected data to the data recognition model, by using the data selected by the recognition data selector 1423 as an input value. Also, the recognition result may be determined by the data recognition model.

The recognition result provider 1424 may provide identification information indicating at least one object recognized from the image. For example, the recognition result provider 1424 may provide a category including an identified object and, when the identified object is a person, information about a feature of the identified person.

The model updater 1425 may update the data recognition model, based on evaluation of the recognition result provided by the recognition result provider 1424. For example, the model updater 1425 may provide the recognition result provided by the recognition result provider 1424 to the model trainer 1414 so that the model trainer 1414 updates the data recognition model.

At least one of the data obtainer 1421, the pre-processor 1422, the recognition data selector 1423, the recognition result provider 1424, or the model updater 1425 in the data recognizer 1420 may be manufactured as at least one hardware chip and may be mounted on an electronic device. For example, at least one of the data obtainer 1421, the pre-processor 1422, the recognition data selector 1423, the recognition result provider 1424, or the model updater 1425 may be manufactured as a dedicated hardware chip for AI, or may be manufactured as a part of an existing general-purpose processor (e.g., a CPU or an application processor) or a graphics processor (e.g., a GPU) and may be manufactured in any of various electronic devices.

Also, the data obtainer 1421, the pre-processor 1422, the recognition data selector 1423, the recognition result provider 1424, and the model updater 1425 may be mounted on one electronic device, or may be respectively provided in separate devices. For example, some of the data obtainer 1421, the pre-processor 1422, the recognition data selector 1423, the recognition result provider 1424, and the model updater 1425 may be included in an electronic device, or the remaining ones may be included in a server.

Also, at least one of the data obtainer 1421, the pre-processor 1422, the recognition data selector 1423, the recognition result provider 1424, or the model updater 1425 may be implemented as a software module. When at least one of the data obtainer 1421, the pre-processor 1422, the recognition data selector 1423, the recognition result provider 1424, or the model updater 1425 is implemented as a software module (or a program module including instructions), the software module may be stored in a non-transitory computer-readable recording medium. Also, in this configuration, at least one software module may be provided by an operating system (OS) or a certain application. Alternatively, at part of at least one software module may be provided by an OS, and the remaining part may be provided by a certain application.

An image processing apparatus and an operating method thereof according to embodiments of the disclosure may be implemented as a recording medium including instructions executable by a computer such as a program module. A computer-readable medium may be a medium accessible by a computer, and examples thereof include all volatile and non-volatile media and separable and non-separable media. Also, examples of the computer-readable medium may include a computer storage medium and a communication medium. Examples of the computer storage medium include all volatile and non-volatile media and separable and non-separable media, which are implemented by various methods or technology, for storing information such as computer-readable instructions, data structures, program modules, or other data. The communication medium generally includes a computer-readable instructions, a data structure, a program module, other data of a modulated data signal such as a carrier wave, or another transmission mechanism, and an example thereof includes an arbitrary information transmission medium.

Also, the term "unit" used herein may be a hardware component such as a processor or a circuit and/or a software component executed in a hardware component such as a processor.

Also, an image processing apparatus and an operating method thereof according to the one or more embodiments of the disclosure may be implemented as a computer program product including a recording medium having embodied thereon a program for executing an image processing method including obtaining a frame by decoding an image sequence, identifying a certain area in the frame by using type information of a macroblock included in the image sequence, and performing an object recognition operation in the identified certain area of the frame by using a neural network and skipping performing an object recognition operation in an area other than the identified certain area.

An image processing apparatus and method according to an embodiment of the disclosure may identify an area in which object recognition is to be performed by using encoding information obtained from a bitstream of a compressed image.

An image processing apparatus and method according to an embodiment of the disclosure may reduce the amount of computation and time required to perform object recognition, by performing object recognition only in an identified area.

While the disclosure has been particularly shown and described with reference to embodiments thereof, it will be understood by one of ordinary skill in the art that various changes in form and details may be made therein without departing from the spirit and scope of the disclosure as defined by the following claims. Hence, it will be understood that the embodiments of the disclosure should be considered in descriptive sense only and not for purposes of limitation. For example, each component described in a single type may be executed in a distributed manner, and components described distributed may also be executed in an integrated form.

What is claimed is:

1. An image processing apparatus comprising:
a memory storing one or more instructions; and
a processor configured to execute the one or more instructions stored in the memory
to obtain an image frame by decoding an encoded image sequence,
to obtain type information of a macroblock of the image frame from the encoded image sequence, and
to identify, based on the type information, an area at which object recognition is to be performed in the image frame obtained by decoding the encoded image sequence.

2. The image processing apparatus of claim 1, wherein the processor is further configured to execute the one or more instructions to identify, based on the type information, the area in the image frame by generating a lookup table storing a lookup table value of 0 or 1 for each pixel of the image frame.

3. The image processing apparatus of claim 2, wherein the processor is further configured to execute the one or more instructions to perform the object recognition in the area of the image frame by using a neural network and skip the object recognition in areas of the image frame other than the area.

4. The image processing apparatus of claim 3, wherein the processor is further configured to execute the one or more instructions to, when a quantity of pixels of the image frame whose lookup table values are 1 is equal to or greater than a threshold number, perform the object recognition in the area of the image frame by using the neural network.

5. The image processing apparatus of claim 2, further comprising a communicator configured to communicate with a neural network,
wherein the communicator is further configured to transmit the image frame and the lookup table to the neural network to perform the object recognition in the area of the image frame and skips performing the object recognition in areas of the image frame other than the area.

6. The image processing apparatus of claim 2, wherein the processor is further configured to execute the one or more instructions to, when the macroblock identified from the type information is a skip macroblock, set a lookup table value of a pixel of the skip macroblock in the lookup table to 0.

7. The image processing apparatus of claim 6, wherein the processor is further configured to execute the one or more instructions to identify a quantity of consecutive skip macroblocks and set lookup table values of pixels for the quantity of consecutive skip macroblocks to 0.

8. The image processing apparatus of claim 2, wherein the processor is further configured to execute the one or more instructions to, when the macroblock identified from the type information is an intra macroblock, set a lookup table value of a pixel of the intra macroblock in the lookup table to 1.

9. The image processing apparatus of claim 2, wherein the processor is further configured to execute the one or more instructions to, when the macroblock identified from the type information is an inter macroblock, set a lookup table value of a pixel of the inter macroblock in the lookup table to 1 or 0 according to whether motion information of the inter macroblock satisfies a criterion.

10. The image processing apparatus of claim 9, wherein the processor is further configured to execute the one or more instructions to, when a size of a motion vector included in the motion information is equal to or less than a threshold value, set the lookup table value of the pixel of the inter macroblock in the lookup table to 0.

11. An image processing method comprising:
obtaining an image frame by decoding an encoded image sequence,
obtaining type information of a macroblock of the image frame in the process of the decoding of the encoded image sequence,
identifying, based on the type information, an area at which object recognition is to be performed in the image frame obtained by decoding the encoded image sequence;
performing the object recognition in the area of the image frame by using a neural network; and
skipping the object recognition in areas of the image frame other than the area.

12. The image processing method of claim 11, wherein the identifying comprises:
generating a lookup table storing a lookup table value of 1 or 0 for each pixel of the image frame based on the type information of the macroblock; and
identifying the area of the image frame by using the lookup table.

13. The image processing method of claim 12, wherein the object recognition comprises identifying, by using the neural network, pixels of the image frame whose lookup table values in the lookup table are 1 as the area.

14. The image processing method of claim 12, wherein the object recognition comprises, when a quantity of pixels of the image frame whose lookup table values are 1 is equal to or greater than a threshold number, performing the object recognition in the area.

15. The image processing method of claim 12, wherein the generating comprises, when the macroblock identified from the type information is a skip macroblock, setting a lookup table value of a pixel of the skip macroblock in the lookup table to 0.

16. The image processing method of claim 15, further comprising identifying a quantity of consecutive skip macroblocks,
wherein the setting of the lookup table value of the pixel of the skip macroblock to 0 comprises setting lookup table values of pixels for the quantity of consecutive skip macroblocks to 0.

17. The image processing method of claim 12, wherein the generating comprises, when the macroblock identified from the type information is an intra macroblock, setting a lookup table value of a pixel of the intra macroblock in the lookup table to 1.

18. The image processing method of claim 12, wherein the generating comprises, when the macroblock identified from the type information is an inter macroblock, setting a lookup table value of a pixel of the inter macroblock in the lookup table to 1 or 0 according to whether motion information of the inter macroblock satisfies a criterion.

19. The image processing method of claim 18, wherein the generating comprises, when a size of a motion vector included in the motion information is equal to or less than a threshold value, setting the lookup table value of the pixel of the inter macroblock in the lookup table to 0.

20. A non-transitory computer-readable recording medium having embodied thereon a program for executing an image processing method, the method comprising:
obtaining an image frame by decoding an encoded image sequence, obtaining type information of a macroblock of the image frame in the process of the decoding of the encoded image sequence, identifying, based on the type information, an area at which object recognition is to be performed in the image frame obtained by decoding the encoded image sequence;

performing the object recognition in the area of the image frame by using a neural network; and skipping the object recognition in areas of the image frame other than the area.

21. An image processing apparatus comprising:

a memory storing one or more instructions; and a processor configured to execute the one or more instructions stored in the memory to:

obtain type information of a macroblock of an image frame from an encoded image sequence, and identify, based on the type information, an area in the image frame at which object recognition is to be performed by generating a lookup table storing a lookup table value for each pixel of the image frame.

* * * * *